(12) United States Patent
Katai et al.

(10) Patent No.: US 6,995,970 B2
(45) Date of Patent: Feb. 7, 2006

(54) METHOD OF MAKING ELECTROCHEMICAL CAPACITOR ELECTRODE, ELECTROCHEMICAL CAPACITOR ELECTRODE, ELECTROCHEMICAL CAPACITOR, AND METHOD OF MAKING THE SAME

(75) Inventors: Kazuo Katai, Tokyo (JP); Yousuke Miyaki, Tokyo (JP); Hideki Tanaka, Tokyo (JP); Kiyonori Hinoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/018,546

(22) Filed: Dec. 22, 2004

(65) Prior Publication Data
US 2005/0162812 A1    Jul. 28, 2005

(30) Foreign Application Priority Data
Dec. 26, 2003 (JP) .......................... P2003-432673

(51) Int. Cl.
*H01G 9/00*  (2006.01)
(52) U.S. Cl. ................. 361/502; 361/509; 29/25.03
(58) Field of Classification Search .............. None
See application file for complete search history.

(56) References Cited

U.S. PATENT DOCUMENTS 6,236,560 B1 *  5/2001  Ikeda et al. ................. 361/502
6,741,450 B2 *  5/2004  Nakazawa et al. ........... 361/502

FOREIGN PATENT DOCUMENTS

| JP | A 9-36005 | 2/1997 |
| JP | A 11-283887 | 10/1999 |
| JP | A 2000-36306 | 2/2000 |
| JP | A 2001-297952 | 10/2001 |

* cited by examiner

*Primary Examiner*—Ha Tran Nguyen
(74) *Attorney, Agent, or Firm*—Oliff & Berridge, PLC

(57) ABSTRACT

The method of making an electrochemical capacitor electrode in accordance with the present invention comprises a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 μm in the coating liquid; a porous layer forming step of applying the porous layer forming coating liquid onto a surface of a collector and then removing the liquid so as to form a porous layer; and a pressing step of pressing the aggregate against the collector by pressing the collector and the porous layer, so as to form a depression and a projection on the surface of the collector formed with the porous layer. This method can make an electrochemical capacitor electrode having a fully reduced internal resistance and a sufficient electrode characteristic.

16 Claims, 21 Drawing Sheets

METHOD OF MAKING ELECTROCHEMICAL CAPACITOR ELECTRODE, ELECTROCHEMICAL CAPACITOR ELECTRODE, ELECTROCHEMICAL CAPACITOR, AND METHOD OF MAKING THE SAME

BACKGROUND OF THE INVENTION

1. Field of the Invention

The present invention relates to a method of making an electrochemical capacitor electrode, an electrochemical capacitor electrode, an electrochemical capacitor, and a method of making the same.

2. Related Background Art

Electrochemical capacitors such as electric double layer capacitor are easy to reduce their size and weight, so that demands therefor have rapidly been increasing in these years as backup power supplies for power supplies of portable devices (small-size electronic devices) and auxiliary power supplies for electric cars and hybrid cars, for example. For improving their performances, various studies have currently been in progress.

For example, when a large capacity is needed as in the case of power supplies for electric cars, high-output electrochemical capacitors having a low internal resistance with a high energy density per unit mass and a high energy density per unit volume have been in demand for development. Small-size capacitors for memory backup and the like have been required to reduce their internal resistance as well.

Known as such electrochemical capacitor electrodes and electrochemical capacitors are those manufactured by the methods disclosed in Japanese Patent Application Laid-Open Nos. HEI 11-283887 and 9-36005. Japanese Patent Application Laid-Open No. HEI 11-283887 discloses the realization of an electric double layer capacitor having a high capacity density and a low internal resistance by screw-extruding a mixture made of a carbonaceous material, polytetrafluoroethylene, and a processing aid, and extending thus extruded product with pressure rolls so as to form a sheet. On the other hand, Japanese Patent Application Laid-Open No. HEI 9-36005 discloses the realization of an electric double layer capacitor having a higher density electrode by mixing activated carbon powder and PTFE so as to yield a paste, applying the paste to a collector, drying the paste by heating it to the melting point of PTFE or higher, and press-molding the product so that the electrode becomes a thin film.

SUMMARY OF THE INVENTION

However, even the above-mentioned methods disclosed in Japanese Patent Application Laid-Open Nos. HEI 11-283887 and 9-36005 have failed to fully lower the internal resistance of electrodes, and thus have not attained sufficient electrode characteristics yet. Therefore, electrochemical capacitors mounted with electrodes made by these manufacturing methods have failed. to achieve sufficient charging/discharging characteristics.

In view of the problems of the prior art mentioned above, it is an object of the present invention to provide a method of making an electrochemical capacitor electrode, which can make an electrochemical capacitor electrode having a fully lowered internal resistance and a sufficient electrode characteristic; an electrochemical capacitor electrode, made by this method, having a fully lowered internal resistance and a sufficient electrode characteristic; and an electrochemical capacitor using this electrochemical capacitor electrode and a method of making the same.

The inventors conducted diligent studies in order to achieve the above-mentioned object and, as a result, have found that the above-mentioned object can be achieved by a method of making an electrochemical capacitor electrode comprising a collector and a porous layer, the method comprising the steps of forming the porous layer by using a porous layer forming coating liquid containing a specific aggregate such as to attain a degree of dispersion falling within a specific range, and causing the aggregate to form a depression and a projection on a surface of the collector formed with the porous layer, and completed the present invention.

Namely, in one aspect, the present invention provides a method of making an electrochemical capacitor electrode comprising a collector having an electronic conductivity and a porous layer having an electronic conductivity, the method comprising:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 $\mu$m in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

As mentioned above, depressions and projections due to the aggregate are formed on the surface of the collector formed with the porous layer in the method of making an electrochemical capacitor electrode in accordance with the present invention. Namely, the aggregate is contained in the porous layer forming coating liquid such that the aggregate has a degree of dispersion of 10 to 200 $\mu$m in the coating liquid, whereby the aggregate is fully pressed against the collector in the pressing step, so that the depressions and projections (irregularities) can be formed easily and reliably on the surface of the collector formed with the porous layer (hereinafter referred to as "porous layer forming surface") When the collector is formed with such depressions and projections, the contact area between the collector and porous layer increases, so as to improve the conductivity between the collector and the porous layer, whereby an electrochemical capacitor electrode having a fully lowered internal resistance and a sufficient electrode characteristic can be obtained.

Here, the degree of dispersion is a value determined according to JIS K 5600-2-5 (1999) by using the above-mentioned porous layer forming coating liquid.

The depressions and projections may have the same or different forms and sizes, and may be arranged orderly in predetermined patterns (e.g., patterns made of depressions or projections) or randomly with uneven intervals. The depressions and projections formed by the method in accordance with the present invention are caused by the aggregate in the above-mentioned pressing step, so that their forms, sizes, intervals, etc. are usually uneven. The forming of depression and projection in the present invention also encompasses a case where the porous layer forming surface of the collector is formed with a plurality of depressions or projections alone. When only a plurality of depressions are formed, for example, the parts free of the depressions become projections.

Preferably, the depression and projection are formed such that the maximum height from the bottom of the depression to the top of the projection is 2 to 10 μm. Here, the maximum height from the bottom of the depression to the top of the projection refers to the height from the bottom of the depression to the top of the projection in the depression and projection adjacent to each other yielding the largest height difference among the depressions and projections while a direction perpendicular to the porous layer forming surface of the collector before forming the depressions and projections is taken as the height direction. Forming such depressions and projections on the porous layer forming surface of the collector can further increase the contact area between the collector and the porous layer, so as to improve the conductivity between the collector and the porous layer, thereby yielding an electrochemical capacitor electrode having a more fully reduced internal resistance and a more sufficient electrode characteristic.

The method of forming the aggregate in the method of making an electrochemical capacitor electrode in accordance with the present invention is not limited in particular. However, when preparing the porous layer forming coating liquid in the coating liquid preparing step, it will be preferred if the aggregate is formed by mixing the solid component and the liquid or if the aggregate or liquid containing the aggregate prepared beforehand is added to the porous layer forming coating liquid.

When a method of forming the aggregate by mixing the solid component and the liquid is employed, the aggregate can be formed in the step of preparing the porous layer forming coating liquid if a mixing condition or the like is adjusted such as to form the aggregate, whereby the aggregate can be formed easily without increasing the number of steps.

When a method of adding the aggregate or liquid containing the aggregate prepared beforehand is employed, the aggregate with required particle size and amount can be added without regulating the mixing condition though it is necessary to prepare the aggregate or liquid containing the aggregate beforehand, whereby the aggregate can be prepared easily and reliably such that the degree of dispersion of the aggregate falls within the range of 10 to 200 μm in the porous layer forming coating liquid.

These methods may be employed in combination. An aggregate may be formed with its mixing condition being regulated while adding thereto an aggregate or liquid containing the aggregate prepared beforehand, so as to prepare the porous layer forming coating liquid.

Preferably, the content of the porous particle in the solid component is 88 to 92 mass % based on the total amount of the solid component in the method of making an electrochemical capacitor electrode in accordance with the present invention. This tends to be able to form the aggregate easily and reliably, and yield an electrochemical capacitor electrode having a more sufficient electrode characteristic.

Preferably, the content of the binder in the solid component is 6.5 to 12 mass % based on the total amount of the solid component. This tends to be able to form the aggregate easily and reliably, and form a porous layer having a sufficient coating strength.

Preferably, the solid component comprises 88 to 92 mass % of the porous particle, 6.5 to 12 mass % of the binder, and 0 to 1.5 mass % of a conductive auxiliary agent having an electronic conductivity based on the total amount of the solid component. This tends to be able to form the aggregate more easily and reliably, and yield a porous layer having a sufficient coating strength, whereby an electrochemical capacitor electrode having a more sufficient electrode characteristic is likely to be obtained.

Preferably, in the pressing step in the method of making an electrochemical capacitor electrode in accordance with the present invention, the collector and the porous layer are pressed by roll pressing. This can fully press the aggregate against the collector, whereby the depression and projection can be formed on the porous layer forming surface of the collector more easily and reliably.

Preferably, in the pressing step, a cylindrical roller having a side face formed with an irregularity pattern is used so as to press the collector and the porous layer while bringing the side face of the roller into contact with a surface of the porous layer, thereby forming an irregularity pattern on the surface of the porous layer.

Forming the irregularity pattern on the surface of the porous layer can improve the specific surface area of the porous layer, thereby yielding a more sufficient electrode characteristic. The forming of the irregularity pattern can more fully reduce the internal resistance of the electrochemical capacitor electrode. Though the reason why the internal resistance is reduced is not totally clear, the inventors presume as follows. Namely, it seems that, since the surface of the porous layer is formed with the irregularity pattern, the adhesion of individual components (the porous particle and conductive auxiliary agent in particular) increases, so as to construct an ideal conduction network in the porous layer, thereby improving the electronic conductivity.

In the irregularity pattern, depressions and projections included in the same pattern may have the same or different forms and sizes. The depressions and projections may be arranged orderly in predetermined patterns (e.g., patterns made of depressions or projections), or randomly with uneven intervals. The step of forming the irregularity pattern encompasses a step of forming a plurality of depressions or projections alone on the surface of the electrochemical capacitor electrode. When the surface of the electrochemical capacitor electrode is formed with a plurality of projections, for example, groove parts positioned between the adjacent projections become depressions. The irregularity pattern is preferably formed on the whole surface of the electrochemical capacitor electrode in order for the electrochemical capacitor electrode to fully improve the electrode characteristic and reduce the internal resistance, but may be formed on a part of the surface of the electrochemical capacitor electrode as well.

In another aspect, the present invention provides an electrochemical capacitor electrode comprising a collector having an electronic conductivity and a porous layer having an electronic conductivity, the electrochemical capacitor electrode being made by a method comprising:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 μm in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

Since this electrochemical capacitor electrode is made by the above-mentioned method of making an electrochemical capacitor electrode in accordance with the present invention, the depression and projection are formed on the porous layer forming surface of the collector, so that the internal resistance is fully reduced, whereby a sufficient electrode characteristic can be obtained.

In still another aspect, the present invention provides an electrochemical capacitor comprising first and second electrodes opposing each other, a separator disposed between the first and second electrodes, an electrolyte, and a case for accommodating the first electrode, second electrode, separator, and electrolyte in a closed state;

wherein at least one of the first and second electrodes is an electrode comprising a collector having an electronic conductivity and a porous layer having an electronic conductivity, the electrochemical capacitor electrode being made by a method comprising:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 $\mu$m in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

The electrochemical capacitor having such a configuration comprises at least one electrochemical capacitor electrode mentioned above, and thus can fully lower the internal resistance and yield a sufficient electrode characteristic.

In still another aspect, the present invention provides a method of making an electrochemical capacitor comprising first and second electrodes opposing each other, a separator disposed between the first and second electrodes, an electrolyte, and a case for accommodating the first electrode, second electrode, separator, and electrolyte in a closed state, the method comprising:

a first step of making an electrochemical capacitor electrode comprising a collector having an electronic conductivity and a porous layer having an electronic conductivity;

a second step of arranging the separator between the first and second electrodes while using the electrode obtained by the first step as at least one of the first and second electrodes;

a third step of accommodating the first electrode, second electrode, and separator into the case;

a fourth step of injecting the electrolyte into the case; and a fifth step of closing the case;

wherein the first step comprises:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 $\mu$m in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

This method can make the above-mentioned electrochemical capacitor in accordance with the present invention easily and reliably. In this method, it will be preferred if the electrode obtained by the first step is used as each of the first and second electrodes.

As mentioned above, the method of making an electrochemical capacitor electrode in accordance with the present invention can easily and reliably make an electrochemical capacitor electrode having a fully lowered internal resistance and a sufficient electrode characteristic. Also, the present invention can provide an electrochemical capacitor electrode and an electrochemical capacitor, each having a fully lowered internal resistance and a sufficient electrode characteristic. The method of making an electrochemical capacitor in accordance with the present invention can make the above-mentioned electrochemical capacitor of the present invention easily and reliably.

DESCRIPTION OF THE PREFERRED EMBODIMENTS

In the following, preferred embodiments of the present invention will be explained in detail with reference to the drawings. In the following explanation, parts identical or equivalent to each other will be referred to with numerals identical to each other without repeating their overlapping descriptions.

Figure 1:
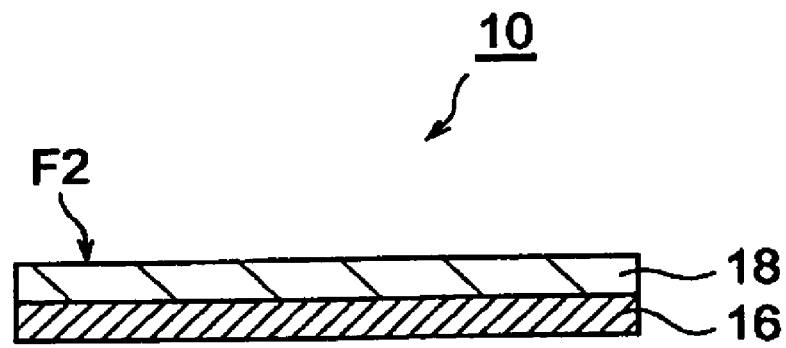
FIG. 1 is a schematic sectional view showing a preferred embodiment of the electrochemical capacitor electrode in accordance with the present invention.

Method of Making Electrochemical Capacitor Electrode and Electrochemical Capacitor Electrode FIG. 1 is a schematic sectional view showing a preferred embodiment of the electrochemical capacitor electrode made by the method of making an electrochemical capacitor electrode in accordance with the present invention. As shown in FIG. 1, this electrochemical capacitor electrode 10 is constituted by a collector 16 having an electronic conductivity and a porous layer 18 having an electronic conductivity formed on the collector 16. The method of making an electrochemical capacitor electrode in accordance with the present invention is a method of making the electrochemical capacitor electrode 10, the method comprising a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 $\mu$m in the coating liquid; a porous layer forming step of applying the porous layer forming coating liquid onto a surface of the collector 16 and then removing the liquid so as to form the porous layer 18; and a pressing step of pressing the aggregate against the collector 16 by pressing the collector 16 and the porous layer 18, so as to form a depression and a projection on the surface of the collector 16 formed with the porous layer 18.

The porous layer forming coating liquid prepared in the coating liquid preparing step contains a solid component including a porous particle having an electronic conductivity and a binder adapted to bind the porous particle, a liquid adapted to dissolve or disperse the binder, and an aggregate made of the solid component, and is prepared such that the aggregate has a degree of dispersion of 10 to 200 $\mu$m in the coating liquid.

Here, the porous particle is one having an electronic conductivity contributing to storing and discharging electric charges, e.g., activated carbon in particulate or fibrous forms. As the activated carbon, phenol-based activated carbon, coconut shell activated carbon, etc. can be used.

The porous particle preferably has an average particle size of 1.5 to 8 $\mu$m, whereas its BET specific surface area determined from its nitrogen adsorption isotherm by using the BET adsorption isotherm is preferably at least 1500 m$^2$/g, more preferably 2000 to 2500 m$^2$/g. Using such a porous particle tends to be able to make an electrochemical capacitor electrode having a more sufficient electrode characteristic.

The binder is not restricted in particular as long as it is a binder which can bind the porous particle, examples of which include polytetrafluoroethylene (PTFE), polyvinylidene fluoride (PVDF), polyethylene (PE), polypropylene (PP), and fluorine rubber. Among them, fluorine rubber is preferably used in the present invention. Using such a binder tends to be able to bind the porous particle sufficiently even by a small content, so as to enhance the coating strength of the porous layer 18 and the size of the double layer interface, thereby improving the electrode characteristic.

Examples of the above-mentioned fluorine rubber include vinylidene fluoride/hexafluoropropylene-based fluorine rubber (VDF/HFP-based fluorine rubber), vinylidene fluoride/hexafluoropropylene/tetrafluoroethylene-based fluorine rubber (VDF/HFP/TFE-based fluorine rubber), vinylidene fluoride/pentafluoropropylene-based fluorine rubber (VDF/PFP-based fluorine rubber), vinylidene fluoride/pentafluoropropylene/tetrafluoroethylene-based fluorine rubber (VDF/PFP/TFE-based fluorine rubber), vinylidene fluoride/perfluoromethylvinyl ether/tetrafluoroethylene-based fluorine rubber (VDF/PFMVE/TFE-based fluorine rubber), and vinylidene fluoride/chlorotrifluoroethylene-based fluorine rubber (VDF/CTFE-based fluorine rubber). Preferred is fluorine rubber in which at least two species selected from the group consisting of VDF, HFP, and TFE are copolymerized. VDF/HFP/TFE-based fluorine rubber in which the three species in the above-mentioned group are copolymerized is preferred in particular, since the adhesion and resistance to chemicals tend to improve further.

The above-mentioned porous layer forming coating liquid contains a solid component including the porous particle and binder, and may further contain a conductive auxiliary agent having an electronic conductivity.

The conductive auxiliary agent has such an electronic conductivity as to be able to advance the transfer of electric charges between the collector 16 and the porous layer 18, an example of which includes carbon black.

Examples of the above-mentioned carbon black include acetylene black, Ketjen black, and furnace black, among which acetylene black is preferably used in the present invention.

The average particle size of the above-mentioned carbon black is preferably 25 to 50 nm, whereas its BET specific surface area is preferably at least 50 m$^2$/g, more preferably 50 to, 140 m$^2$/g.

The porous layer forming coating liquid also contains a liquid adapted to dissolve or disperse the binder.

This liquid is not restricted in particular as long as it can dissolve or disperse the binder, examples of which include ketone-based solvents such as methylethylketone (MEK) and methylisobutylketone (MIBK).

The above-mentioned porous layer forming coating liquid further contains an aggregate made of the above-mentioned solid component.

This aggregate is contained in the porous layer forming coating liquid such that a degree of dispersion of 10 to 200 $\mu$m is obtained when the degree of dispersion of the porous layer forming coating liquid is measured according to JIS K 5600-2-5 (1999). Namely, the aggregate is contained in the porous layer forming coating liquid by such particle size and content that the degree of dispersion in the porous layer forming coating liquid falls within the range mentioned above. As a gauge used for measuring the degree of dispersion, a grind gauge (0 to 200 μm) manufactured by Tester Sangyo Co., Ltd. is used here.

The aggregate may be contained in the porous layer forming coating liquid while in a state swelled with the above-mentioned liquid as well.

Figure 2:
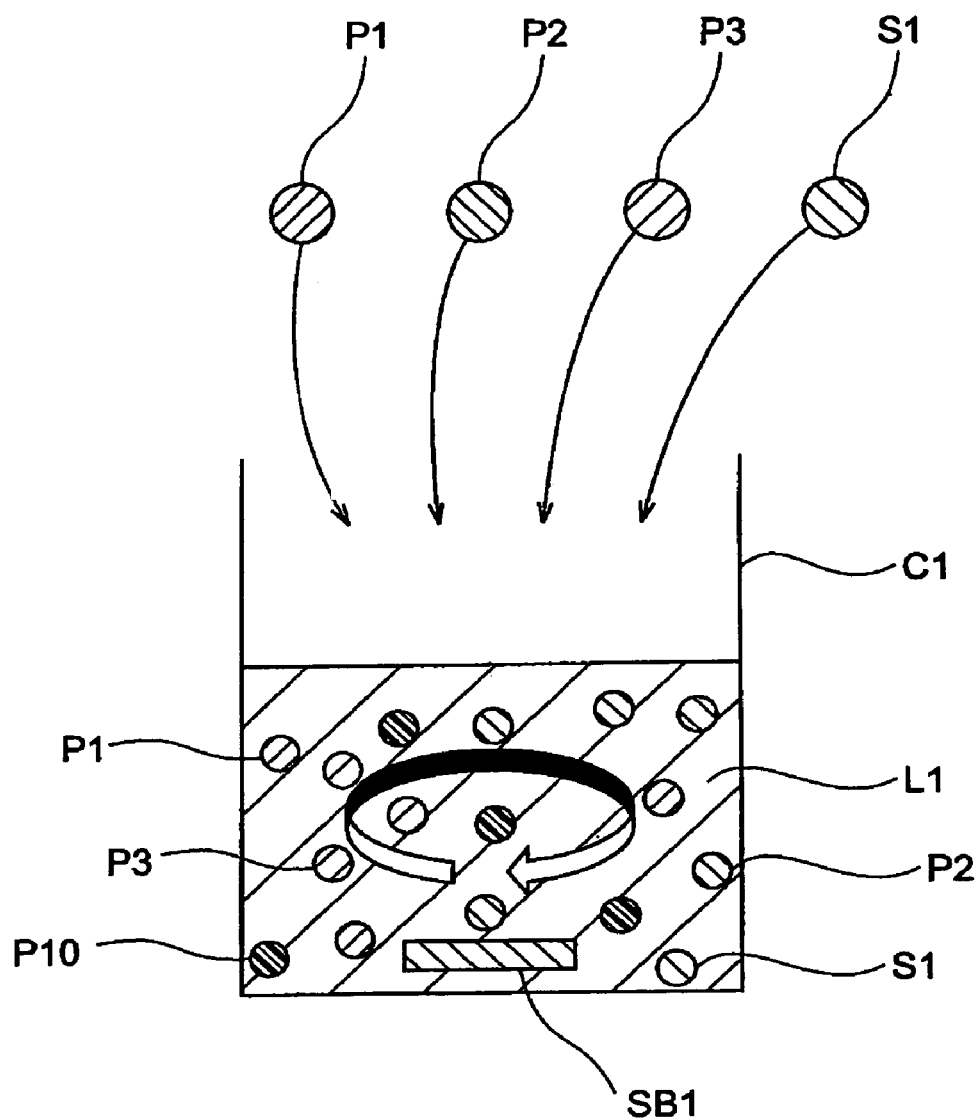
FIG. 2 is an explanatory view for explaining a step of preparing a porous layer forming coating liquid.

The porous layer forming coating liquid containing such solid composition, liquid, and aggregate is prepared as follows, for example. Namely, as shown in FIG. 2, the above-mentioned porous particle P1, binder P2, and liquid S1, with the above-mentioned conductive auxiliary agent P3 if necessary, are put into a container C1 containing a stirring bar SB1, and are stirred and mixed, so as to form the above-mentioned aggregate P10, and the porous layer forming coating liquid is prepared such that the degree of dispersion of the aggregate P10 in the coating liquid L1 becomes 10 to 200 μm in the coating liquid L1 (coating liquid preparing step). Here, the stirring time and temperature are required to be under such a condition that the above-mentioned aggregate is formed while the degree of dispersion falls within the above-mentioned range, e.g., the stirring time and temperature are adjusted to respective ranges on the orders of 30 minutes to 1 hour and 10° to 70° C.

The porous layer forming coating liquid L1 may also be prepared such that the above-mentioned porous particle P1, binder P2, and liquid S1, with the above-mentioned conductive auxiliary agent P3 if necessary, are put into the container C1 containing the stirring bar SB1, an aggregate P10 or liquid containing the aggregate P10 prepared beforehand is then put therein, and they are stirred and mixed, so that the degree of dispersion of the aggregate P10 becomes 10 to 200 μm in the coating liquid L1. Adding the aggregate P10 or liquid containing the aggregate P10 prepared beforehand tends to be able to regulate the degree of dispersion of the porous layer forming coating liquid easily, and prepare the porous layer forming coating liquid L1 having a degree of dispersion within the above-mentioned range more easily and reliably.

More preferably, the porous layer forming coating liquid L1 is prepared such that the degree of dispersion of the aggregate P10 in the coating liquid L1 becomes 10 to 50 μm in the coating liquid L1. Preparing the porous layer forming coating liquid L1 with the degree of dispersion falling within the range mentioned above can fully press the aggregate P10 against the collector 16 in the pressing step, and thus can easily and reliably form the porous layer forming surface of the collector with depressions and projections required for yielding an electrochemical capacitor electrode having a fully lowered internal resistance and a sufficient electrode characteristic.

Preferably, the content of the porous particle P1 in the porous layer forming coating liquid L1 is 88 to 92 mass % based on the total amount of the solid component (total solid component amount including the aggregate P10) excluding the liquid S1 in the porous layer forming coating liquid L1. Preferably, the content of the binder P2 is 6.5 to 12 mass % based on the total amount of the solid component in the porous layer forming coating liquid L1. Preferably, the solid component in the porous layer forming coating liquid L1 comprises 88 to 92 mass % of the porous particle P1, 6.5 to 12 mass % of the binder P2, and 0 to 1.5 mass % of the conductive auxiliary agent P3 based on the total amount of the solid component. Here, the above-mentioned contents of the porous particle P1, binder P2, and conductive auxiliary agent P3 indicate their total contents including the respective amounts of the porous particle P1, binder P2, and conductive auxiliary agent P3 in the aggregate P10.

More preferred respective ranges of contents of the individual ingredients (porous particle P1, binder P2, and conductive auxiliary agent P3) are as follows. The content of the porous particle P1 is more preferably 89 to 91 mass %, 89.5 to 90.5 mass % in particular. The content of the binder P2 is more preferably 8 to 10 mass %, 8.5 to 9.5 mass % in particular. The content of the conductive auxiliary agent P3 is more preferably 0.5 to 1.5 mass %, 0.5 to 1.0 mass % in particular.

Preferably, the compounding amount of the liquid S1 in the porous layer forming coating liquid L1 is 200 to 400 parts by mass with respect to 100 parts by mass of the total amount of the solid component (total solid component amount including the aggregate P10) in the porous layer forming coating liquid L1.

In the method of making an electrochemical capacitor electrode in accordance with the present invention, the above-mentioned porous layer forming coating liquid L1 is applied onto a surface of the collector 16, and then the liquid S1 is removed, so as to form the porous layer 18 (porous layer forming step). Then, the collector 16 and the porous layer 18 are pressed, so that the above-mentioned aggregate P10 in the porous layer 18 is pressed against the collector 16, whereby the surface of the collector 16 formed with the porous layer 18 is formed with depressions and projections (pressing step).

Here, the collector 16 is not limited in particular as long as it is a conductor which can sufficiently allow electric charges to migrate to the porous layer 18, whereby collectors used in known electrochemical capacitor electrodes can be employed. Examples of the collector 16 include foils of metals such as aluminum. As metal foils, those etched, extended, etc. can be used without any restrictions in particular. Preferably, in the present invention, the collector 16 is made of aluminum.

As a method of applying the porous layer forming coating liquid L1 onto the surface of the collector 16, conventionally known coating methods can be used without any restrictions in particular. For example, methods such as extrusion lamination, doctor blading, gravure coating, reverse coating, applicator coating, and screen printing can be employed. Among these methods, a coating method based on extrusion lamination is preferably employed, since a film is likely to be applied more thinly and evenly thereby while in a state where its constituents are highly dispersed. In the following, a method of making the electrochemical capacitor electrode 10 by using a coating method based on extrusion lamination will be explained.

Figure 3:
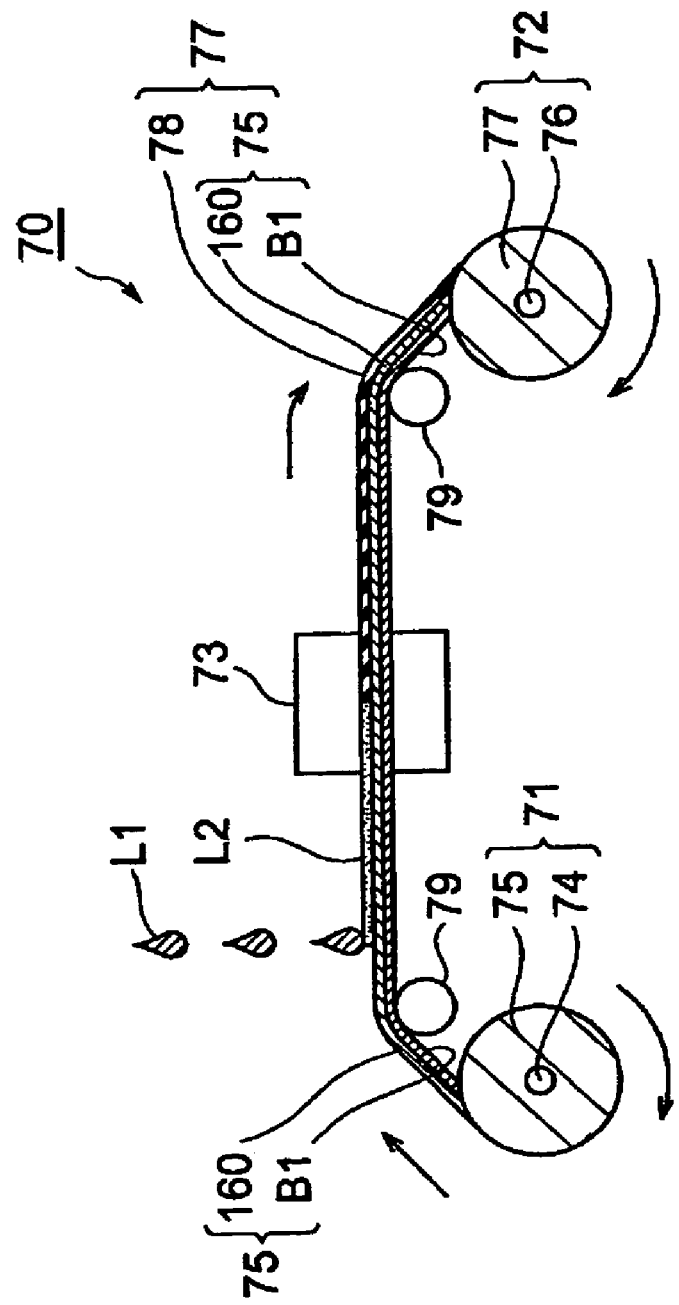
FIG. 3 is an explanatory view for explaining a step of forming an electrode sheet by using the porous layer forming coating liquid.
Figure 4:
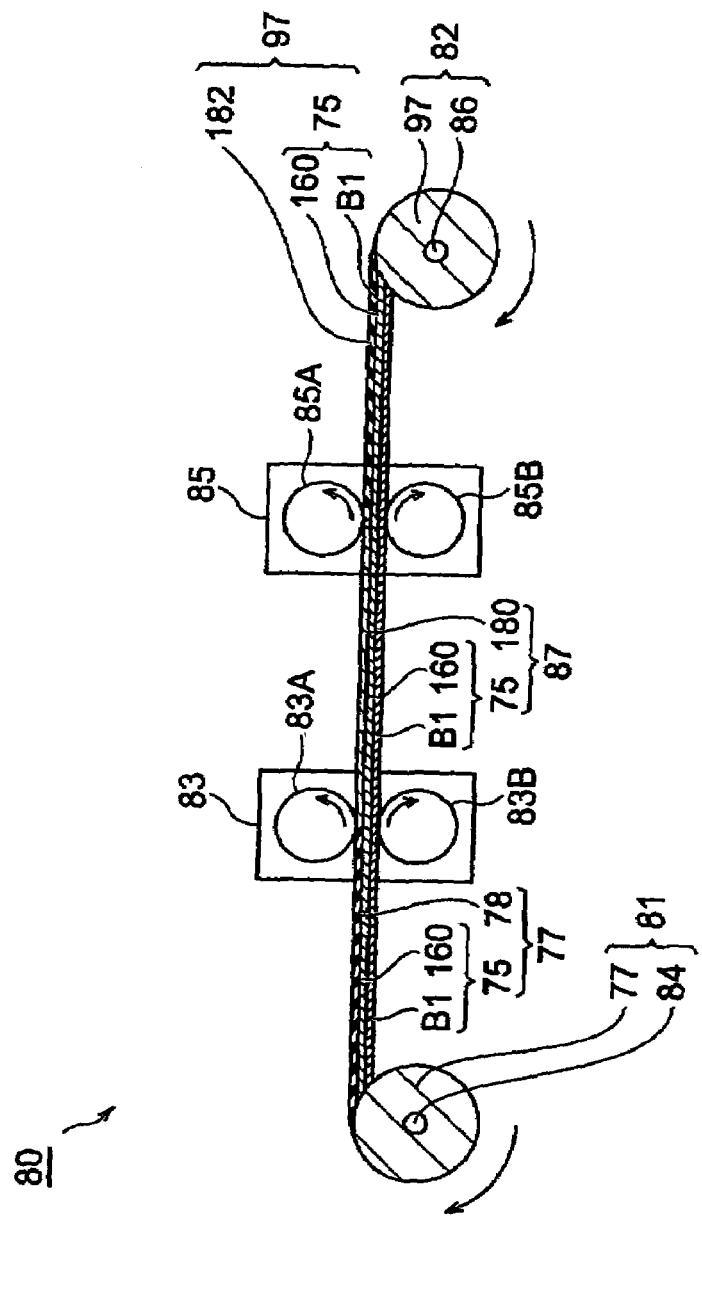
FIG. 4 is an explanatory view for explaining the step of forming the electrode sheet by using the porous layer forming coating liquid.

In the method of making an electrochemical capacitor electrode in accordance with the present invention, the electrochemical capacitor electrode 10 is formed like a sheet by using apparatus 70 and 80 shown in FIGS. 3 and 4, respectively.

The apparatus 70 shown in FIG. 3 is mainly constituted by a first roll 71, a second roll 72, a dryer 73 disposed between the first roll 71 and second roll 72, and two support rolls 79. The first roll 71 is composed of a cylindrical core 74 and a tape-like first laminate sheet 75. One end of the first laminate sheet 75 is connected to the core 74, about which the first laminate sheet 75 is wound. The first laminate sheet 75 has a configuration in which a metal foil sheet 160 (a sheet to become the collector 16 in the electrode 10) is laminated on a base sheet B1.

The second roll 72 includes a cylindrical core 76 to which the other end of the first laminate sheet 75 is connected. A core driving motor (not depicted) for rotating the core 76 of the second roll 72 is connected to the core 76, so that a second laminate sheet 77 coated with the porous layer forming coating liquid L1 and then dried in the dryer 73 is wound at a predetermined speed.

Initially, when the core driving motor revolves, the core 76 of the second roll 72 rotates, whereby the first laminate sheet 75 wound about the core 74 of the first roll 71 is drawn out of the first roll 71. Subsequently, the porous layer forming coating liquid L1 is applied onto the metal foil sheet 160 of the drawn first laminate sheet 75. This forms a coating L2 made of the porous layer forming coating liquid L1 on the metal foil sheet 160.

Next, as the core driving motor revolves, the first laminate sheet 75 formed with the coating L2 is guided into the dryer 73 by the support rolls 79. In the dryer 73, the coating L2 on the first laminate sheet 75 is dried, so that the liquid S1 in the coating L2 is removed, so as to leave a layer 78 (hereinafter referred to as "precursor layer 78") to become a precursor of the porous layer 18 when formed into an electrode. The drying of the coating L2 in the dryer 73 is not restricted in particular as long as it is carried out under such a condition that the liquid S1 in the coating is sufficiently removed, but is preferably performed at 70° to 130° C. for 0.1 to 3 minutes.

As the core driving motor revolves, the second laminate sheet 77 formed with the precursor layer 78 formed on the first laminate sheet 75 is guided to and wound about the core 76 by the support rolls 79.

Next, using the apparatus 80 shown in FIG. 4, an electrode sheet E10 is made from the above-mentioned second laminate sheet 77.

The apparatus 80 shown in FIG. 4 is mainly constituted by a first roll 81, a second roll 82, two roller presses 83, 85 disposed between the first roll 81 and second roll 82. The first roll 81 is composed of a cylindrical core 84 and the above-mentioned tape-like second laminate sheet 77. One end of the second laminate sheet 77 is connected to the core 84, about which the second laminate sheet 77 is wound. The second laminate sheet 77 has such a configuration that the precursor layer 78 is further laminated on the first laminate sheet 75 in which the metal foil sheet 160 is laminated on the base sheet B1.

The second roll 82 includes a cylindrical core 86 to which the other end of the second laminate sheet 77 is connected. A core driving motor (not depicted) for rotating the core 86 of the second roll 82 is connected to the core 86, so that a fourth laminate sheet 97 after being pressed by the roller presses 83 and 84 is wound at a predetermined speed.

First, when the core driving motor revolves, the core 86 of the second roll 82 rotates, whereby the second laminate sheet 77 wound about the core 84 of the first roll 81 is drawn out of the first roll 81, so as to be guided into the roller press 83. Disposed within the roller press 83 are two cylindrical rollers 83A and 83B. The rollers 83A and 83B are arranged such that the second laminate sheet 77 can be inserted therebetween. The rollers 83A and 83B are placed such that, when the second laminate sheet 77 is inserted between them, the side face of the roller 83A and the outer surface of the precursor layer 78 of the second laminate sheet 77 come into contact with each other, whereas the side face of the roller 83B and the outer surface (rear face) of the base sheet B1 of the second laminate sheet 77 come into contact with each other, and the second laminate sheet 77 can be pressed at a predetermined temperature and pressure. The cylindrical rollers 83A and 83B are provided with respective rotating mechanisms rotating in a direction conforming to the moving direction of the second laminate sheet 77. The length (length in a direction perpendicular to the plane of FIG. 4) between bottom faces in each of the cylindrical rollers 83A and 83B is not smaller than the width of the second laminate sheet 77. The precursor layer 78 on the second laminate sheet 77 is heated and pressed in the roller press 83 as necessary, so as to become a porous layer 180, thereby yielding a third laminate sheet 87.

Figure 5:
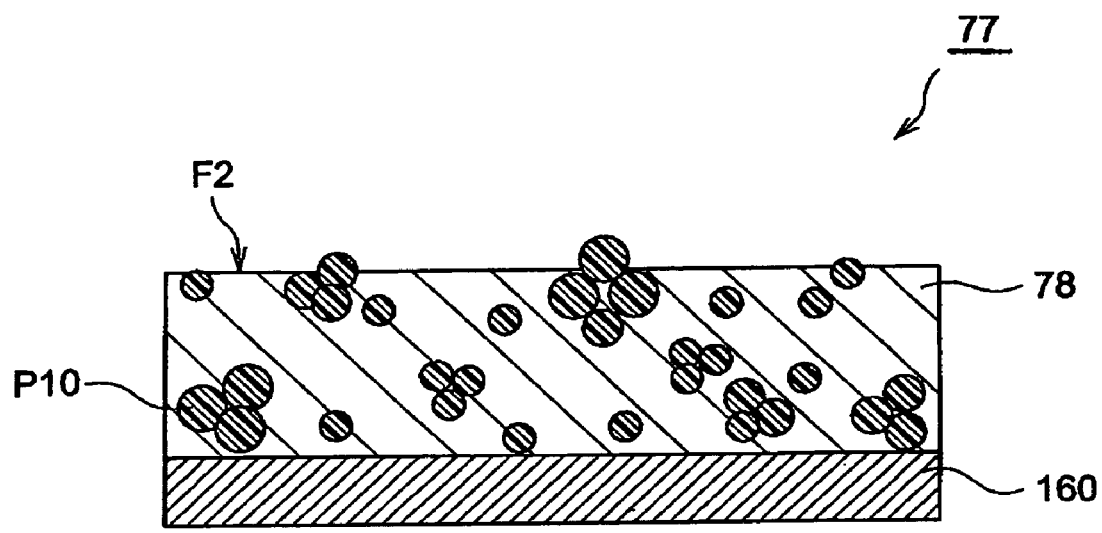
FIG. 5 is a schematic sectional view showing a second laminate sheet 77.
Figure 6:
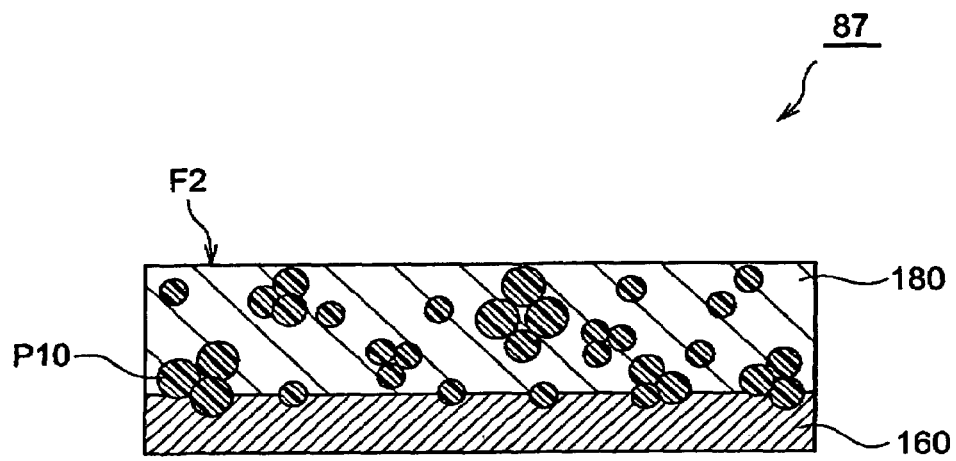
FIG. 6 is a schematic sectional view showing a third laminate sheet 87.

FIG. 5 is a schematic sectional view showing the second laminate sheet 77, whereas FIG. 6 is a schematic sectional view showing the third laminate sheet 87. As shown in FIG. 5, the precursor layer 78 constituting the second laminate sheet 77 contains aggregates P10, which are pressed against the metal foil sheet 160 when the roller press 83 presses the precursor layer 78 and metal foil sheet 160. When the aggregates P10 are pressed, the surface of the metal foil sheet 160 formed with the porous layer 180 is deformed, whereby depressions and projections are formed as shown in FIG. 6.

Figure 7:
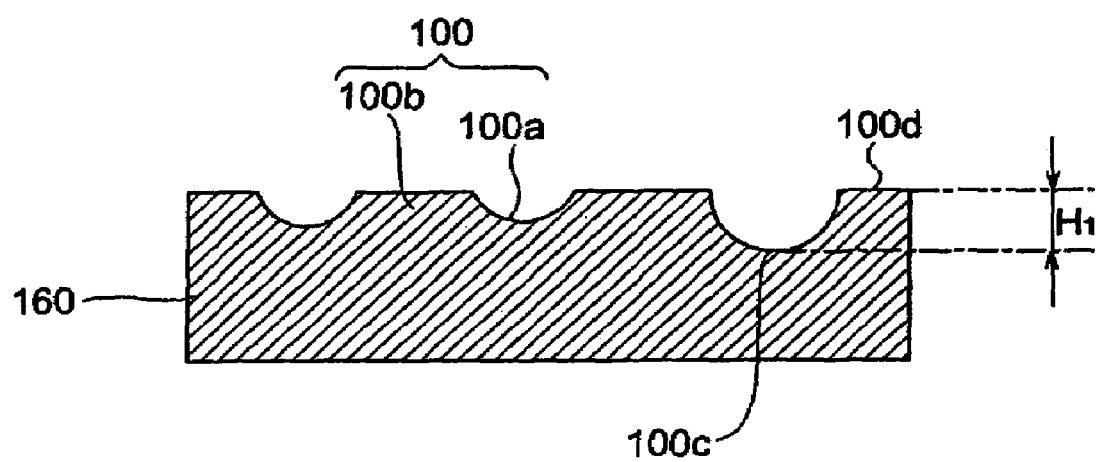
FIG. 7 is a schematic sectional view showing a metal foil sheet 160 formed with depressions and projections.

FIG. 7 is a schematic sectional view showing the metal foil sheet 160 formed with the depressions and projections. As shown in FIG. 7, an irregular part 100 formed by the aggregates P10 comprises a plurality of depressions 100a and projections 100b. A plurality of depressions 100a are formed in a randomly arranged state while having nonuniform sizes. Preferably, the irregular part 100 is formed such that the maximum height $H_1$ from the bottom 100c to the top 100d is 5 to 100 $\mu$m. Forming the porous layer forming surface of the metal foil sheet 160 with such an irregular part 100 improves the conductivity between the metal foil sheet 160 and the porous layer 180, whereby an electrochemical capacitor electrode having a fully reduced internal resistance and a sufficient electrode characteristic can be obtained.

The aggregates P10 form the depressions and projections on the metal foil sheet 160, and are destroyed by the pressure at the time of pressing. Therefore, the aggregates P10 are in a fully destroyed state when the electrochemical capacitor electrode 10 is made, whereby an electrode 10 having a sufficient electrode characteristic can be obtained.

As the second roll 82 rotates, thus formed third laminate sheet 87 is guided into the other roller press 85. Disposed within the roller press 85 are two cylindrical rollers 85A and 85B. The rollers 85A and 85B are arranged such that the third laminate sheet 87 can be inserted therebetween. The rollers 85A and 85B are placed such that, when the third laminate sheet 87 is inserted between them, the side face of the roller 85A and the outer surface of the porous layer 180 of the third laminate sheet 87 come into contact with each other, whereas the side face of the roller 85B and the outer surface (rear face) of the base sheet B1 of the third laminate sheet 87 come into contact with each other, and the third laminate sheet 87 can be pressed at a predetermined temperature and pressure. The cylindrical rollers 85A and 85B are provided with respective rotating mechanisms rotating in a direction conforming to the moving direction of the third laminate sheet 87. The length (length in a direction perpendicular to the plane of FIG. 4) between bottom faces in each of the cylindrical rollers 85A and 85B is not smaller than the width of the third laminate sheet 87.

The third laminate sheet 87 pressed by the roller press 85 is formed with a porous layer 182, so as to become the fourth laminate sheet 97, which is wound about the core 86 as the core driving motor revolves.

Figure 8:
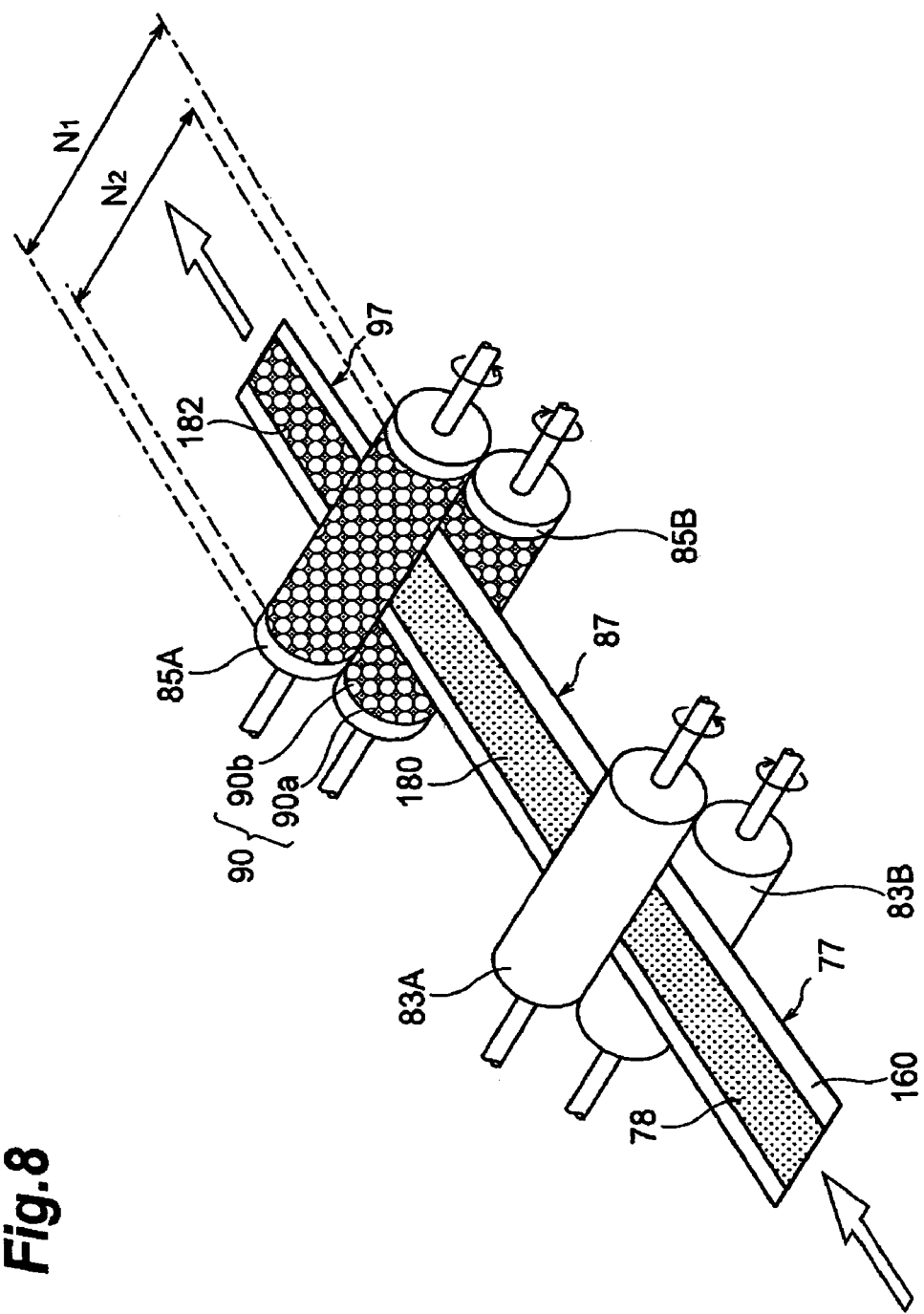
FIG. 8 is a schematic view showing an example of a pressing step with respect to the laminate sheet by rollers.

FIG. 8 is a schematic view showing pressing steps with respect to the second laminate sheet 77 and third laminate sheet 87 by the rollers 83A, 83B and rollers 85A, 85B. As shown in FIG. 8, parts coming into contact with the third laminate sheet 87 in the outer surfaces of the rollers 85A, 85B are provided with irregularity pattern parts 90. Each irregularity pattern part 90 comprises a plurality of depressions 90a and projections 90b. A plurality of projections 90b are formed in an orderly arranged state. The length $N_1$ of each roller 85A, 85B is about 160 mm, for example, in which the length $N_2$ of the irregularity pattern part 90 is about 100 mm, for example.

Figure 9:
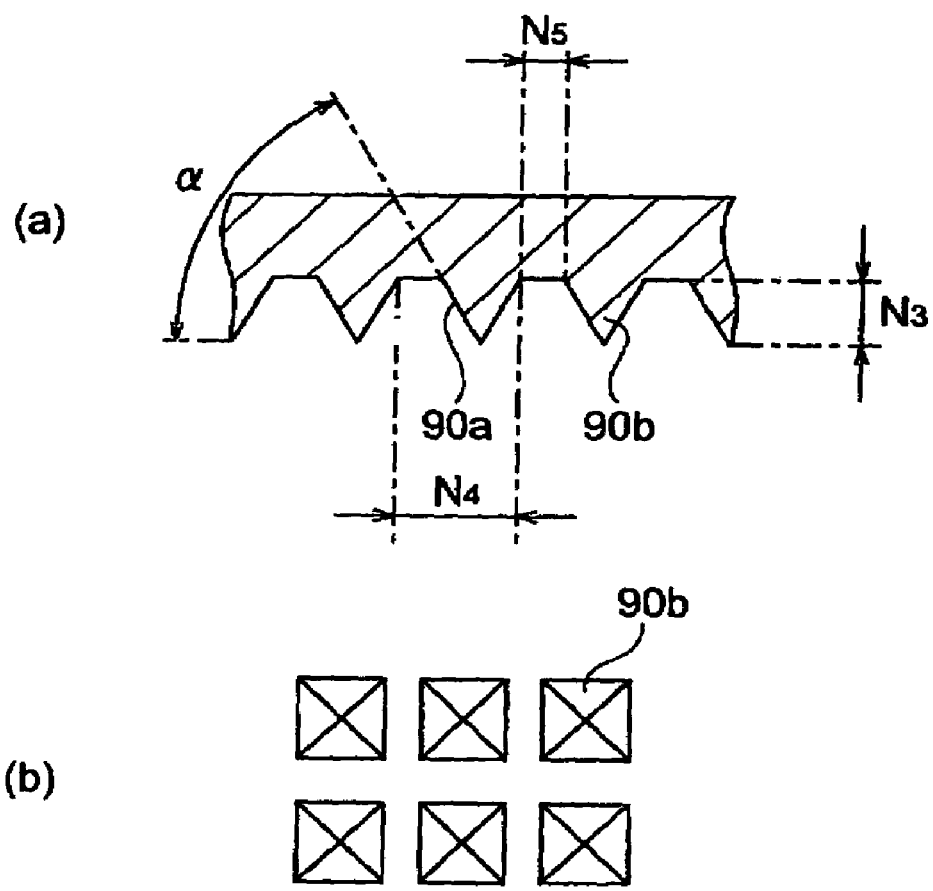
FIG. 9 is a view showing an example of depressions and projections in an irregularity pattern part of a roller.

FIG. 9 shows an example of the depressions 90a and projections 90b in such an irregularity pattern part 90. FIG. 9(a) is a schematic sectional view of the depressions 90a and projections 90b, whereas FIG. 9(b) is a plan view showing the depressions 90a and projections 90b of FIG. 9(a). As shown in FIG. 9, a plurality of projections 90b, each having a pyramidal form, are orderly provided with equally spaced intervals. The depressions 90a are positioned between the projections 90b.

Figure 10:
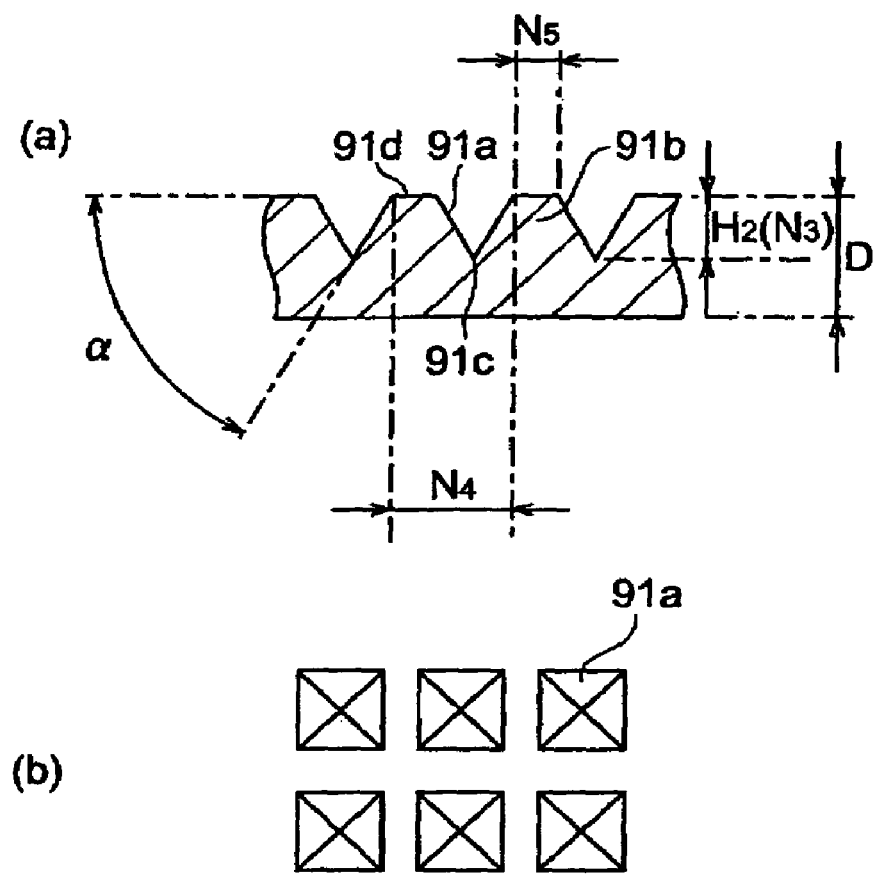
FIG. 10 is a view showing an example of depressions and projections in an irregularity pattern part of a porous layer.

FIG. 10 shows an example of the surface of the porous layer 182 formed with an irregularity pattern, in which FIG. 10(a) is a schematic sectional view showing depressions 91a and projections 91b, whereas FIG. 10(b) is a plan view showing the depressions 91a and projections 91b of FIG. 10(a). As shown in FIG. 10(a), the porous layer 182 is formed with an irregularity pattern having bottoms 91c and tops 91d constituted by the depressions 91a and projections 91b to which the projections 90b and depressions 90a in FIG. 9 are transferred.

The third laminate sheet 87 formed after the pressing by the roller press 83 is guided into the above-mentioned roller press 85, so as to be inserted and pressed between the rollers 85A and 85B. As a consequence, the depressions 90a and projections 90b of the irregularity pattern part 90 in the roller 85A are transferred to the porous layer 180 of the third laminate sheet 87, so that the surface of the latter is formed with depressions and projections, thus yielding the porous layer 182 (to become the porous layer 18 when formed into the electrochemical capacitor electrode 10).

Figure 11:
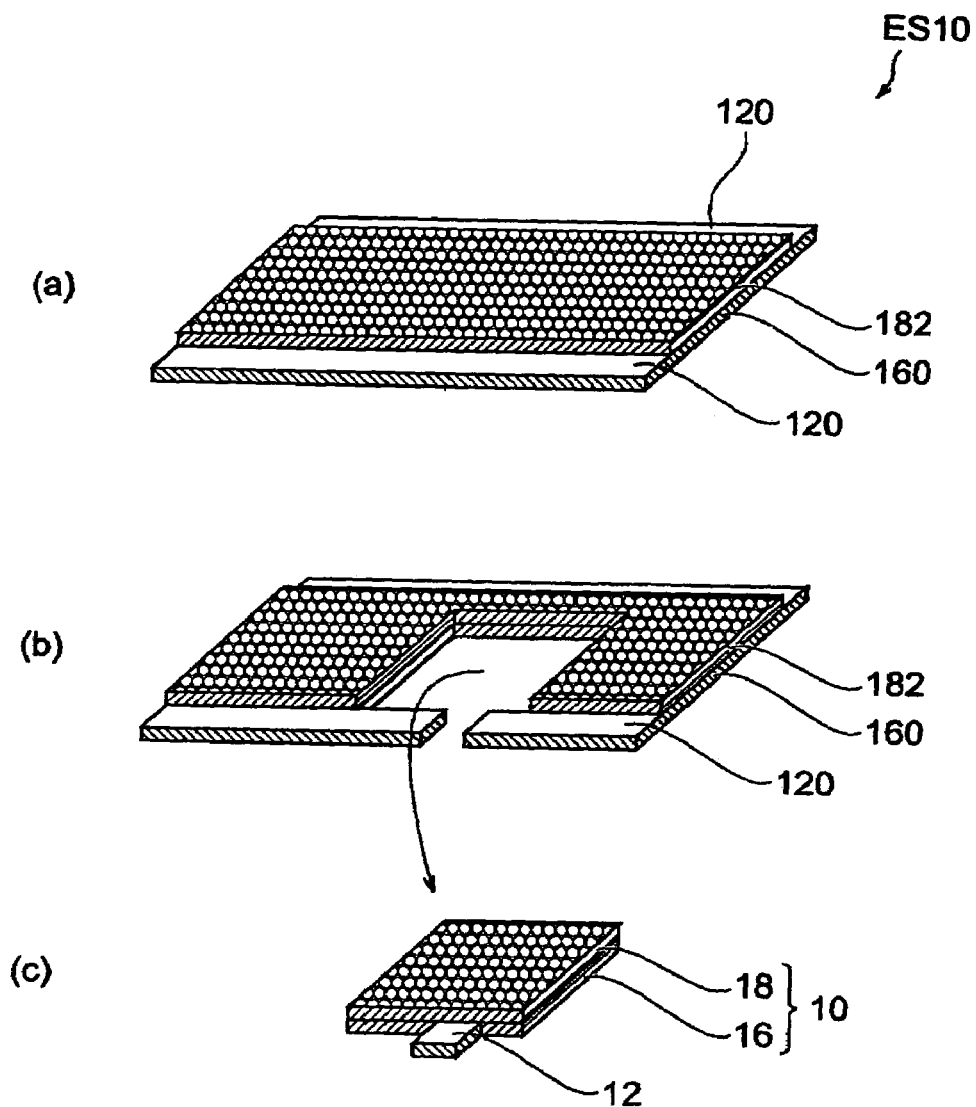
FIG. 11 is an explanatory view for explaining a step of forming an electrode from an electrode sheet.

Next, as shown in FIG. 11(a), the laminate sheet 87 wound about the core 86 is cut into a predetermined size, so as to yield an electrode sheet ES10. The electrode sheet ES10 shown in FIG. 11(a) is formed with fringes 120 where the surface of the metal foil sheet 160 is exposed. The fringes 120 can be formed when the electrode forming coating liquid L1 is adjustably applied to only the center part of the metal foil sheet 160 of the first laminate sheet 75.

Subsequently, as shown in FIG. 11(b), the electrode sheet ES10 is punched out in conformity to the scale of the electrochemical capacitor to be made, whereby the electrochemical capacitor electrode 10 shown in FIG. 11(c) is obtained. If the electrode sheet ES10 is punched out such that a part of the above-mentioned fringes 120 is included as a lead 12, the electrochemical capacitor electrode 10 in accordance with the present invention can be obtained in a state integrated with the lead 12. If not connected beforehand, the lead 12 is separately prepared and electrically connected to the electrochemical capacitor electrode 10.

Since the surface of the porous layer 182 in thus manufactured electrochemical capacitor electrode 10 is formed with the, depressions 91a and projections 91b transferred from the irregularity pattern part 90, the specific surface area of the porous layer 182 improves, whereby a more sufficient electric characteristic can be obtained. The forming of such an irregularity pattern can also reduce the internal resistance of the electrochemical capacitor electrode 10.

The electrochemical capacitor electrode 10 in accordance with the present invention made by the above-mentioned method of making an electrochemical capacitor electrode will now be explained.

The electrochemical capacitor electrode 10 in accordance with the present invention has a configuration previously explained with reference to FIG. 1 and is made by the above-mentioned method of making an electrochemical capacitor electrode in accordance with the present invention, whereby the is surface of the collector 16 formed with the porous layer 18 is provided with the irregular part 100 constituted by a plurality of depressions 100a and projections 100b as shown in FIG. 7.

In the irregular part 100 (depressions 100a and projections 100b), the maximum height $H_1$ from the bottom 100c to the top 100d is preferably 2 to 10 μm as mentioned above. Forming the porous layer forming surface of the collector 16 with such an irregular part 100 improves the conductivity between the collector 16 and the porous layer 18 and fully lowers the internal resistance, whereby a sufficient electrode characteristic can be obtained in the electrochemical capacitor electrode 10.

From the viewpoint of reducing the size and weight of the electrochemical capacitor electrode 10, the thickness of the collector 16 is preferably 15 to 50 μm, more preferably 20 to 40 μm. The above-mentioned thickness refers to the maximum thickness of the collector 16.

The porous layer 18 is a layer which is formed on the collector 16, contributes to storing and discharging electric charges, and contains the porous layer P1, the binder P2, and the conductive auxiliary agent P3 used when necessary.

The content of the porous particle P1 in the porous layer 18 is preferably 88 to 92 mass % based on the total amount of the porous layer 18. The content of the binder P2 is preferably 6.5 to 12 mass % based on the total amount of the porous layer 18. Preferably, the porous layer 18 comprises 88 to 92 mass % of the porous particle P1, 6.5 to 12 mass % of the binder P2, and 0 to 1.5 mass % of the conductive auxiliary agent P3.

In the porous layer having such a configuration, more preferable ranges of the respective contents of the individual components (porous particle P1, binder P2, and conductive auxiliary agent P3) are as follows. The porous particle content is more preferably 89 to 91 mass %, 89.5 to 90.5 mass % in particular. The binder content is more preferably 8 to 10 mass %, 8.5 to 9.5 mass % in particular. The conductive auxiliary agent content is more preferably 0.5 to 1.5 mass %, 0.5 to 1.0 mass % in particular.

The electrochemical capacitor electrode 10 in accordance with the present invention comprises the porous layer 18 containing the above-mentioned components by the above-mentioned contents, and thus can attain a sufficient electrode characteristic. Further, the porous layer 18 can yield a sufficient coating strength.

Preferably, the porous layer 18 in the electrochemical capacitor electrode 10 in accordance with the present invention is formed so as to yield an apparent density of 0.62 to 0.70 g/cm$^3$, more preferably 0.64 to 0.69 g/cm$^3$, 0.65 to 0.68 g/cm$^3$ in particular. A more sufficient electrode characteristic can be obtained when the apparent density falls within the range mentioned above.

From the viewpoint of reducing the size and weight of the electrochemical capacitor electrode 10, the thickness of the porous layer 18 is preferably 50 to 200 μm, more preferably 80 to 150 μm. When the thickness of the porous layer 18 is not uniform (e.g., when the above-mentioned irregularity pattern is formed), the above-mentioned thickness refers to the maximum thickness. When the porous layer 18 has a thickness falling within the above-mentioned range, the electrochemical capacitor can reduce its size and weight.

Preferably, the porous layer 18 has a void volume of 50 to 80 μL. When the porous layer 18 has such a void volume, the electrochemical capacitor electrode 10 of the present invention can sufficiently secure a contact interface with an electrolyte. The above-mentioned "void volume" is a value indicating the total pore volume of the porous layer 18. When there are voids or fine cracks formed between particles constituting the porous layer 18, the void volume is calculated while incorporating the volumes of voids and cracks therein. The void volume can be determined by a known method such as ethanol immersion.

Preferably, the porous layer 18 has a surface F2 formed with the irregularity pattern shown in FIG. 10 by the above-mentioned method of making an electrochemical capacitor electrode, more preferably with an irregularity pattern in which the height $H_2$ from the bottom 91c to the top 91d is at least 50% of the maximum thickness D of the porous layer.

When the surface F2 of the porous layer 18 is formed with such an irregularity pattern, the specific surface area of the porous layer 18 improves, so that a sufficient electrode characteristic is obtained, while the internal resistance is reduced.

The thickness (maximum thickness) of the whole electrochemical capacitor electrode 10 in which the collector 16 and the porous layer 18 are laminated is preferably 70 to 250 μm, more preferably 100 to 180 μm. Such a thickness allows the electrochemical capacitor to reduce its size and weight.

Electrochemical Capacitor and Method of Making the Same

The electrochemical capacitor in accordance with the present invention includes first and second electrodes opposing each other as its anode and cathode, whereas at least one (preferably each) of the anode and cathode is the above-mentioned electrochemical capacitor electrode 10 in accordance with the present invention. In the following, a preferred embodiment of the electrochemical capacitor in accordance with the present invention is specifically explained in terms of a case where each of the anode and cathode is the electrochemical capacitor electrode 10 in accordance with the present invention by way of example. The electrochemical capacitor electrode 10 of the present invention shown in FIG. 1 is used as the anode 10 in the following electrochemical capacitor of the present invention.

Figure 12:
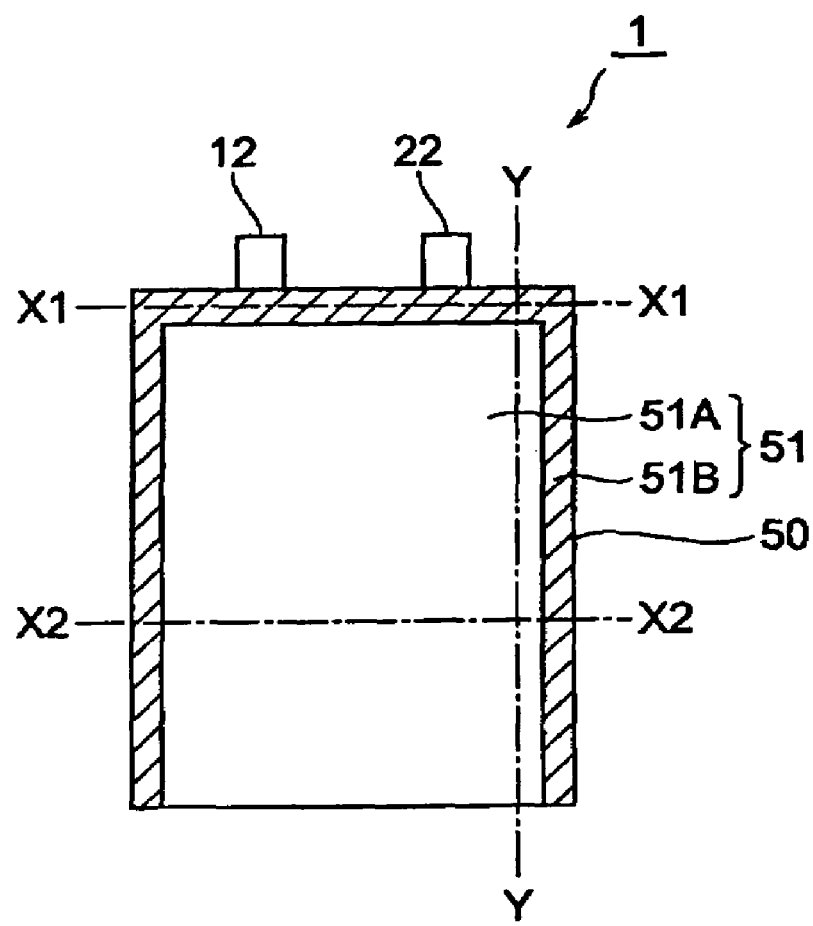
FIG. 12 is a front view showing a preferred embodiment of the electrochemical capacitor in accordance with the present invention.
Figure 13:
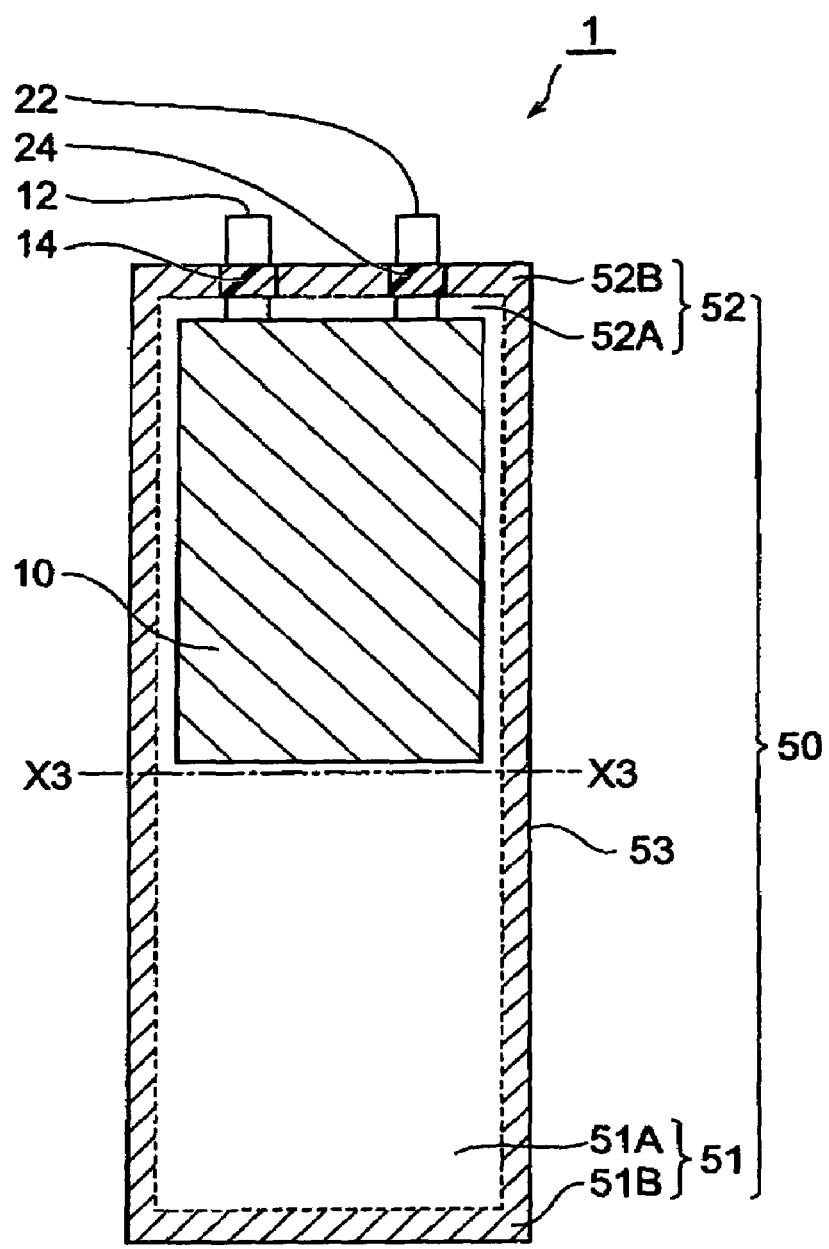
FIG. 13 is an unfolded view showing the interior of the electrochemical capacitor shown in FIG. 12 as seen in a normal direction of the surface of an anode 10.
Figure 14:
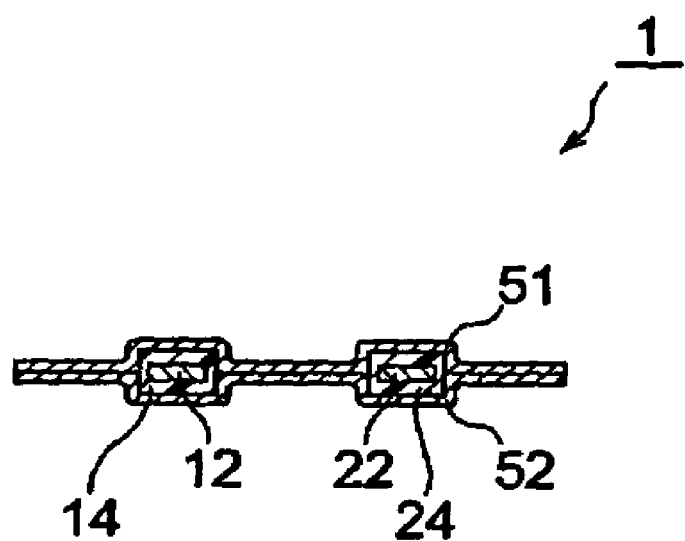
FIG. 14 is a schematic sectional view of the electrochemical capacitor shown in FIG. 12 taken along the line X1—X1 of FIG. 12.
Figure 15:
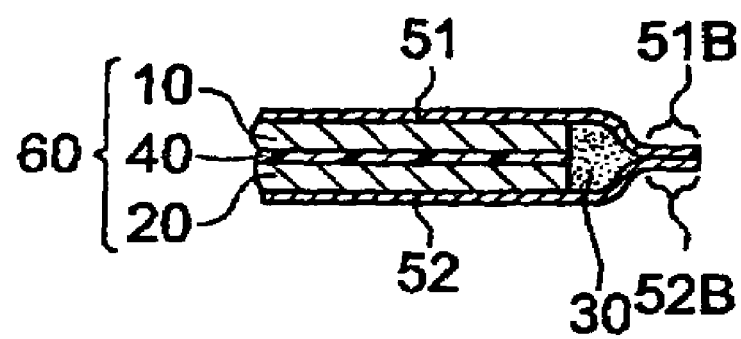
FIG. 15 is a schematic sectional view showing a major part of the electrochemical capacitor shown in FIG. 12 taken along the line X2—X2 of FIG. 12.
Figure 16:
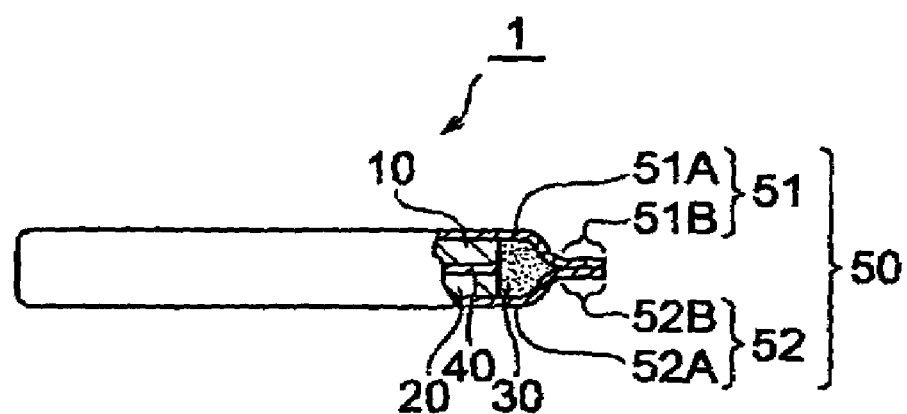
FIG. 16 is a schematic sectional view showing a major part of the electrochemical capacitor shown in FIG. 12 taken along the line Y—Y of FIG. 12.
Figure 17:
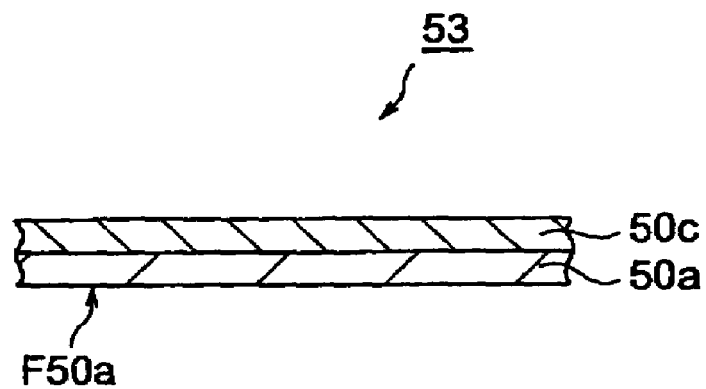
FIG. 17 is a schematic sectional view showing an example of basic configuration of a film which becomes a constituent material of a case in the electrochemical capacitor shown in FIG. 12.

FIG. 12 is a front view showing a preferred embodiment of the electrochemical capacitor (electric double layer capacitor) in accordance with the present invention. FIG. 13 is, an unfolded view of the interior of the electrochemical capacitor shown in FIG. 12 as seen from a normal direction of the surface of the anode 10. FIG. 14 is a schematic sectional view of the electrochemical capacitor shown in FIG. 12 taken along the line X1—X1 of FIG. 12. FIG. 15 is a schematic sectional view of the electrochemical capacitor shown in FIG. 12 taken along the line X2—X2 of FIG. 12. FIG. 16 is a schematic sectional view of the electrochemical capacitor shown in FIG. 12 taken along the line Y—Y of FIG. 12.

As shown in FIGS. 12 to 16, the electrochemical capacitor 1 mainly comprises a planar anode 10 (first electrode) and a planar cathode 20 (second electrode) which oppose each other, a planar separator 40 disposed between the anode 10 and cathode 20, a nonaqueous electrolytic solution 30, and a case 50 for accommodating them in a closed state; and further comprises an anode lead 12 having one end part electrically connected to the anode 10 and the other end part projecting out of the case 50, and a cathode lead 22 having one end part electrically connected to the cathode 20 and the other end part projecting out of the case 50. Here, for convenience of explanation, the "anode" 10 and "cathode" 20 are determined with reference to their polarities when discharging the electrochemical capacitor 1.

The electrochemical capacitor 1 has the configuration explained in the following. The individual constituents in this embodiment will now be explained in detail with reference to FIGS. 1 and 12 to 19.

The case 50 comprises a first film 51 and a second film 52 which oppose each other. As shown in FIG. 13, the first film 51 and second film 52 in this embodiment are joined to each other. Namely, the case 50 in accordance with this embodiment is formed when a rectangular film constituted by a single composite package film is folded along a fold line X3—X3 shown in FIG. 13, and a pair of opposing fringes of the rectangular film (a fringe 51B of the first film 51 and a fringe 52B of the second film 52B in the drawing) are overlaid on each other and sealed together with an adhesive or by heat.

The first film 51 and second film 52 refer to respective parts formed when the single rectangular film is folded as mentioned above. In this specification, the respective fringes of the first film 51 and second films 52 after joining together are referred to as "seal parts".

This makes it unnecessary to provide the part of fold line X3—X3 with a seal part for joining the first film 51 and second film 52 to each other, whereby the seal parts in the case 50 can be reduced. As a result, the volume energy density based on the volume of a space where the electrochemical capacitor 1 is to be placed can further be improved. The above-mentioned "volume energy density" is originally defined by the ratio of the total output energy with respect to the total volume including the container of the electrochemical capacitor. On the other hand, the "volume energy density based on the volume of the space where the electrochemical capacitor is to be placed" refers to the ratio of the total output energy of the electrochemical capacitor with respect to the apparent volume determined according to the maximum length, maximum width, and maximum thickness of the electrochemical capacitor. In practice, when mounting the electrochemical capacitor onto a small-size electronic device, it is important to improve the volume energy density based on the volume of the space where the electrochemical capacitor is to be placed as well as the above-mentioned original volume energy density from the viewpoint of effectively utilizing a limited space within the small-size electronic device while fully reducing its dead space.

In the case of this embodiment, as shown in FIGS. 12 and 13, respective one ends of the anode lead 12 connected to the anode 10 and the cathode lead 22 are arranged so as to project out of the seal part joining the fringe 51B of the first film 51 and the fringe 52B of the second film 52 to each other.

Preferably, the film constituting the first film 51 and second film 52 is a flexible film. The film is light in weight and is easy to become thinner, whereby the electrochemical capacitor itself can be formed like a thin film. This can easily improve the original volume energy density, and the volume energy density based on the volume of the space where the electrochemical capacitor is to be placed.

Preferably, this film is a flexible film. From the viewpoint of effectively preventing the moisture and air from entering the case from the outside, and the electrolytic component from dissipating from the inside of the case to the outside, the film is preferably a "composite package film" comprising, at least, an innermost layer made of a synthetic resin in contact with the electrolyte and a metal layer disposed on the upper side of the innermost layer. Examples of the composite package film usable as the first film 51 and second film 52 include composite package films having the respective configurations shown in FIGS. 17 and 18. The composite package film 53 shown in FIG. 17 comprises an innermost layer 50*a* made of a synthetic resin in contact with the electrolyte by its inner face F50*a* and a metal layer 50*c* disposed on the other surface (outer face) of the innermost layer 50*a*. The composite package film 54 shown in FIG. 18 has a configuration in which an outermost layer 50*b* made of a synthetic resin is further disposed on the outer face of the metal layer 50*c* of the composite package film 53 shown in FIG. 17.

The composite package film usable as the first film 51 and second film 52 is not limited in particular as long as it is a composite package material including at least two layers comprising at least one synthetic resin layer such as the above-mentioned innermost layer and a metal layer made of a metal foil or the like. More preferably, from the viewpoint of more reliably attaining the same effect as that mentioned above, the composite package film is constituted by at least three layers comprising the innermost layer, the outermost layer made of a synthetic resin disposed on the outer surface side of the case 50 farthest from the innermost layer, and at least one metal layer disposed between the innermost and outermost layers as with the composite package film 54 shown in FIG. 18.

The innermost layer is a flexible layer. Its constituent material is not restricted in particular as long as it is a synthetic resin which can exhibit the flexibility and has a chemical stability (a property of not causing chemical reactions, dissolution, and swelling) against the electrolyte in use and a chemical stability against oxygen and water (moisture in the air). A material exhibiting a low permeability to oxygen, water (moisture in the air), and electrolyte components is preferred. Examples of the material include engineering plastics and thermoplastic resins such as polyethylene, polypropylene, acid-denatured polyethylene, acid-denatured polypropylene, polyethylene ionomers, and polypropylene ionomers.

Here, "engineering plastics" refer to plastics having such an excellent dynamic property as to be used in mechanical components, electric components, housing materials, etc., and a heat resistance and a durability. Its examples include polyacetal, polyamide, polycarbonate, polyoxytetramethylene oxyterephthaloyl, polybutylene terephthalate, polyethylene terephthalate, polyimide, and polyphenylene sulfide.

Figure 18:
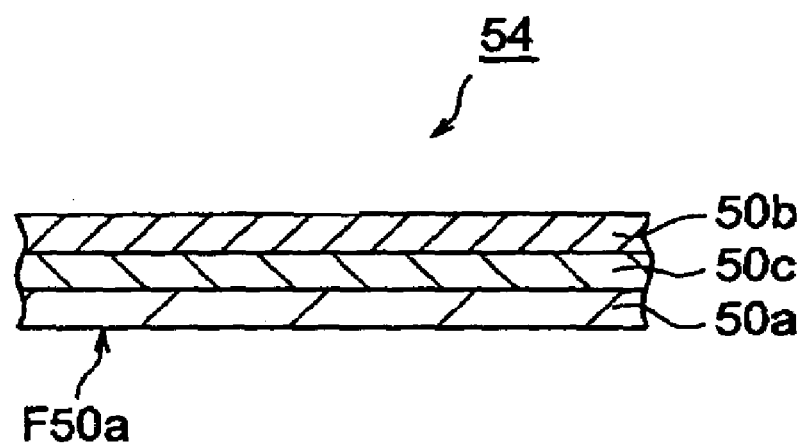
FIG. 18 is a schematic sectional view showing another example of basic configuration of a film which becomes a constituent material of a case in the electrochemical capacitor shown in FIG. 12.
Figure 19:
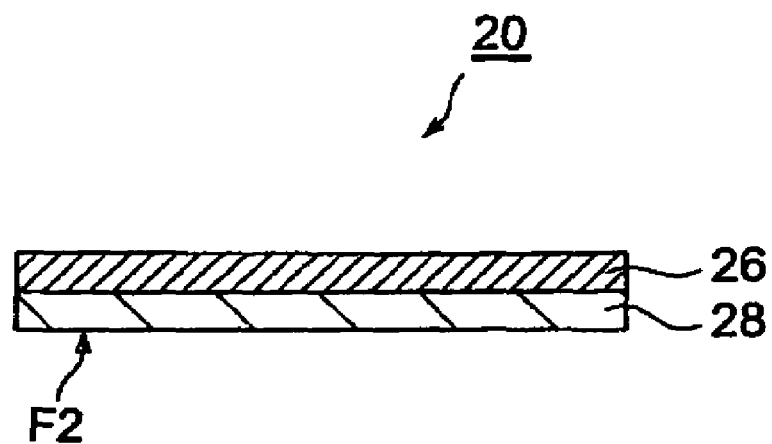
FIG. 19 is a schematic sectional view showing an example of basic configuration of a cathode in the electrochemical capacitor shown in FIG. 12.

When a synthetic resin layer such as the outermost layer 50*b* is further provided in addition to the innermost layer 50*a* as in the composite package film 54 shown in FIG. 18, this synthetic resin layer may use a constituent material similar to that of the innermost layer. As this synthetic resin layer, a layer made of engineering plastics such as polyethylene terephthalate (PET) and polyamide (nylon), for example, may be used as well.

The method of sealing all the seal parts in the case 50 is not limited in particular, but is preferably heat sealing from the viewpoint of productivity.

The metal layer is preferably a layer formed from a metal material exhibiting an anticorrosion property with respect to oxygen, water (moisture in the air), and the electrolyte. For example, metal foils made of aluminum, aluminum alloys, titanium, chromium, and the like may be used.

The anode 10 and cathode 20 will now be explained. The anode 10 is one employing the electrochemical capacitor electrode 10 explained above as shown in FIG. 1. The cathode 20 is one employing an electrode having a configuration similar to that of the electrochemical capacitor electrode 10 explained above as shown in FIG. 19. The cathode 20 shown in FIG. 19 has a configuration comprising a collector 26 and a porous layer 28 formed on one surface of the collector as with the anode 10.

The separator 40 disposed between the anode 10 and cathode 20 is preferably formed from an insulating porous body. Examples of the insulating porous body include laminates of films made of polyethylene, polypropylene, and polyolefin; extended films made of mixtures of the resins mentioned above; fibrous nonwoven fabrics made of at least one constituent material selected from the group consisting of cellulose, polyester, and polypropylene.

The collector 28 of the cathode 20 is electrically connected to one end of a cathode lead 22 made of aluminum, for example, whereas the other end of the cathode lead 22 projects out of the case 50. On the other hand, the collector 18 of the anode 10 is electrically connected to one end of an anode lead conductor 12 made of copper or nickel, for example, whereas the other end of the anode bad conductor 12 projects out of the sealing bag 14.

The inner space of the case 50 is filled with the electrolytic solution 30, a part of which is preferably contained in the anode 10, cathode 20, and separator 40.

The electrolytic solution 30 is not limited in particular, whereby electrolytic solutions (aqueous electrolytic solutions and electrolytic solutions using organic solvents) used in known electrochemical capacitors such as electric double layer capacitors can be employed. When the electrochemical capacitor is an electric double layer capacitor, electrolytic solutions using organic solvents (nonaqueous electrolytic solutions) are preferably employed, since the aqueous electrolytic solutions have electrochemically low decomposition voltages so that the tolerable voltage of the capacitor is limited to a low level thereby.

The species of the electrolytic solution 30 is not limited in particular, but is chosen in view of the solubility of solute, degree of dissociation, and viscosity of liquid in general, and preferably an electrolytic solution having a high conductivity and a high potential window (high decomposition start voltage). Its typical examples include those obtained when quaternary ammonium salts such as tetraethylammonium tetrafluoroborate are dissolved in organic solvents such as propylene carbonate, diethylene carbonate, and acetonitrile. In this case, mingling moistures must be controlled strictly.

As shown in FIGS. 12 and 13, the part of the anode lead 12 coming into contact with the seal part of the sealing bag constituted by the fringe 51B of the first film 51 and the fringe 52B of the second film 52 is coated with an insulator 14 for preventing the anode lead 12 from coming into contact with the metal layer in the composite package film constituting the individual films. The part of the cathode lead 22 coming into contact with the seal part of the sealing bag constituted by the fringe 51B of the first film 51 and the fringe 52B of the second film 52 is coated with an insulator 24 for preventing the cathode lead 22 from coming into contact with the metal layer in the composite package film constituting the individual films.

The configuration of the insulators 14 and 24 is not limited in particular. For example, each of them may be formed from a synthetic resin. If the metal layer in the composite package film can sufficiently be prevented from coming into contact with the anode lead 12 and cathode lead 22, the insulators 14 and 24 may be omitted.

Methods of making the above-mentioned case 50 and electrochemical capacitor 1 will now be explained.

The method of making a matrix 60 (a laminate in which the anode 10, separator 40, and cathode 20 are successively laminated in this order) is not limited in particular, whereby known thin-film manufacturing techniques employed in the making of known electrochemical capacitors can be used.

After the anode 10 and cathode 20 are made by the method of making an electrochemical capacitor electrode in accordance with the present invention explained above, the separator 40 is disposed between the anode 10 and cathode 20 in contact therewith (in a nonbonding state), whereby the matrix 60 is completed.

An example of method of making the case 50 will now be explained. First, when constructing the first and second films from the above-mentioned composite package film, known manufacturing methods such as dry lamination, wet lamination, hotmelt lamination, and extrusion lamination are used.

For example, a film to become a synthetic resin layer constituting a composite package film and a metal foil made of aluminum or the like are prepared. The metal foil can be prepared by extending a metal material.

Next, the metal foil is bonded by way of an adhesive onto the film to become the synthetic resin layer, and so forth, so as to yield a configuration preferably comprising a plurality of layers mentioned above, thereby producing a composite package film (multilayer film). Then, the composite package film is cut into a predetermined size, so as to prepare a rectangular film.

Subsequently, as explained with reference to FIG. 13, one film 53 is folded, and the matrix 60 is arranged therein.

Next, thermal fusion is carried out in the parts where the first and second leads are to be arranged between the fringe (seal part 51B) to be thermally fused in the first film 51 and the fringe (seal part 52B) to be thermally fused in the first film 52 among the contact parts to be thermally fused in the first film 51 and second film 52. Here, the above-mentioned adhesive is applied to the surface of the anode lead 12 from the viewpoint of more reliably attaining a sufficient sealing performance of the case 50. As a consequence, an adhesive layer 14 made of the adhesive contributing to the adhesion of the anode lead 12 and the first film 51 and second film 52 is formed therebetween after the thermal fusion. In the same procedure as that explained in the foregoing, a part surrounding the cathode lead 22 is subjected to thermal fusion simultaneously with or separately from the former thermal fusion, whereby the case 50 having a sufficient sealing performance can be formed.

Next, in the seal part 51B (fringe 51B) of the first film 51 and the seal part 52B (fringe 52B) of the second film 52, the part other than the above-mentioned parts surrounding the anode lead 12 and cathode lead 22 is heat-sealed (thermally welded) by a desirable seal width with a sealer under a predetermined heating condition, for example.

Figure 20:
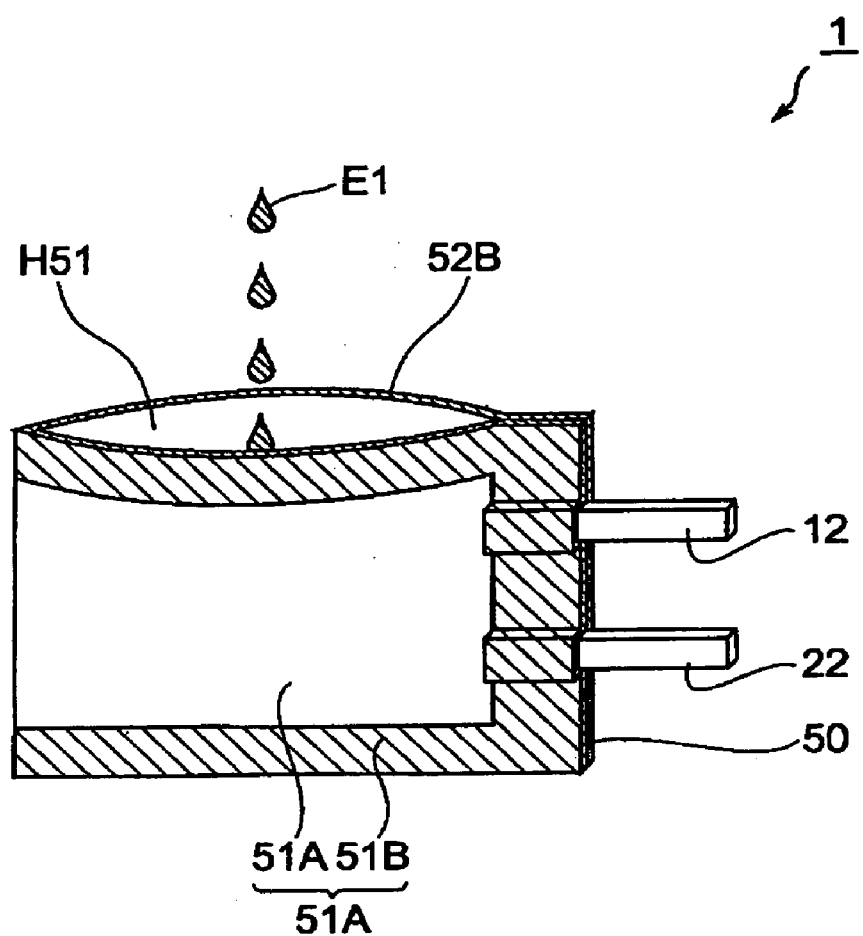
FIG. 20 is an explanatory view showing a procedure of filling the case with a nonaqueous electrolytic solution.

Here, as shown in FIG. 20, a part free of heat sealing is provided in order to secure an opening H51 for injecting the nonaqueous electrolytic solution 30. This yields the case 50 in a state having the opening H51.

Figure 21:
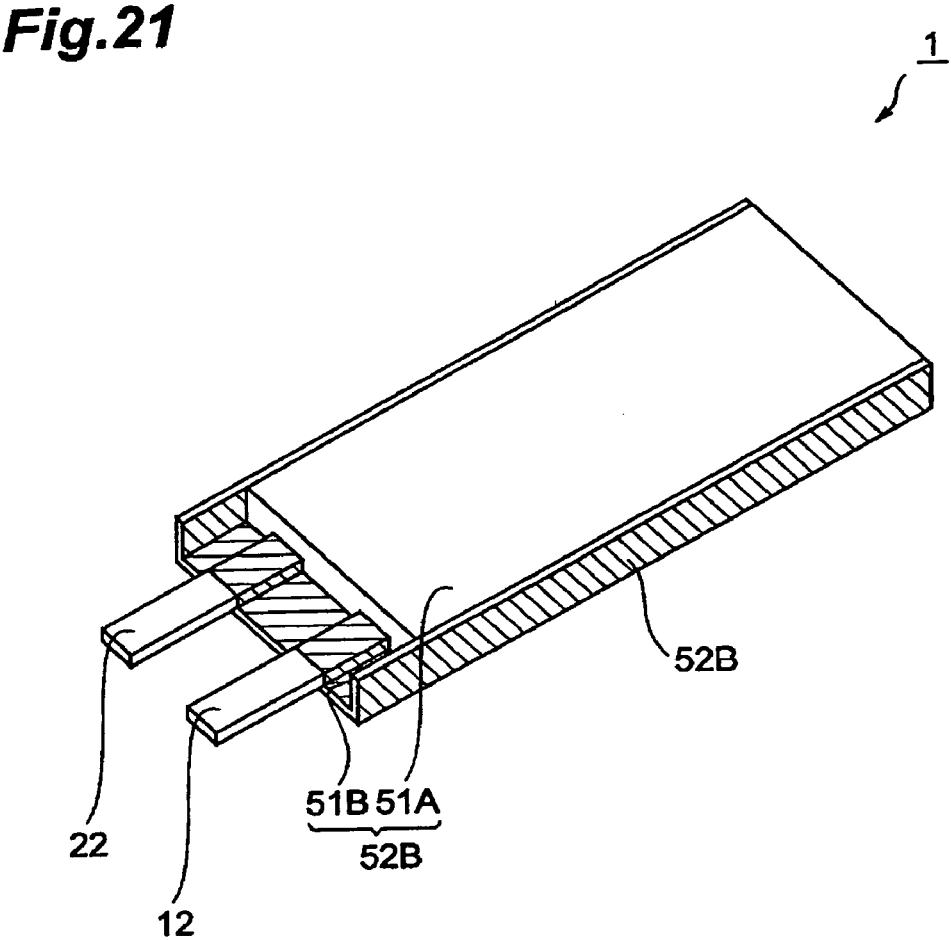
FIG. 21 is a perspective view showing the electrochemical capacitor when seal parts of the case are bent.

Then, as shown in FIG. 20, the nonaqueous electrolytic solution 30 is injected from the opening H51. Subsequently, a vacuum sealer is used for sealing the opening H51 of the case 50. Further, from the viewpoint of improving the volume energy density based on the space where the resulting electrochemical capacitor 1 is to be placed, the seal parts of the case 50 are folded as shown in FIG. 21 when necessary. Thus, the making of the case 50 and electrochemical capacitor 1 (electric double layer capacitor) is completed.

The electrochemical capacitor 1 having such a configuration uses at least one electrochemical capacitor electrode (anode 10 or cathode, 20) in accordance with the present invention mentioned above, and thus can attain a sufficient electrode characteristic.

Though preferred embodiments of the present invention are explained in detail in the foregoing, the present invention is not limited thereto. For example, though the depressions 91a and projections 91b in the irregularity pattern in the electrochemical capacitor electrode (anode 10 or cathode 20) in the above-mentioned embodiments are orderly arranged with the same forms and same sizes, they may have different forms and different sizes or may be arranged randomly.

Though only one pressing operation of passing the third laminate sheet 87 between the rollers 85A and 85B is carried out in the above-mentioned embodiments, this operation may be performed a plurality of times.

Though the electrochemical capacitor 1 comprising the anode 10 and cathode 20 one by one is explained in the above-mentioned embodiments, more than one set of anode 10 and cathode 20 with one separator always being disposed therebetween may be provided.

Though the electrochemical capacitor 1 using the nonaqueous electrolytic solution 30 as an electrolyte is explained in the above-mentioned embodiments, solid electrolytes such as solid polymer electrolytes may be used as well.

Though the above-mentioned embodiments mainly explain a case where the electrode double layer capacitor is made by the making method in accordance with the present invention, the electrochemical capacitor made by the method of the present invention is not limited to the electric double layer capacitor, and can be employed for making electrochemical capacitors such as pseudocapacity capacitor, pseudocapacitor, and redox capacitor, for example.

EXAMPLES

In the following, the present invention will be explained more specifically with reference to Examples and Comparative Examples, which do not restrict the present invention.

Example 1

Preparing of Porous Layer Forming Coating Liquid

A mixture in which 90 parts by mass of particulate activated carbon (product name: BP-20 manufactured by Kuraray Chemical Co., Ltd.) and 1 part by mass of acetylene black (product name: Denka Black manufactured by Denki Kagaku Kogyo Co., Ltd.) were mixed for 15 minutes by a planetary mixer, and 9 parts by mass of fluorine rubber (product name: Viton-GF manufactured by DuPont) were put into 150 parts by mass of MIBK, and they were kneaded for 30 minutes by a planetary mixer. Subsequently, 150 parts by mass of MIBK were further added to the kneaded product, and they were stirred for 1 hour, so as to form an aggregate made of activated carbon, acetylene black, and fluorine rubber, whereby a porous layer forming coating liquid having a degree of dispersion of 30 to 200 μm measured according to JIS K 5600-2-5 (1999) was prepared.

Making of Electrochemical Capacitor Electrode

The above-mentioned porous layer forming coating liquid was uniformly applied onto one surface of an aluminum foil (having a thickness of 20 μm) by extrusion lamination, and MIBK was eliminated within a drying furnace at 100° C., whereby a laminate sheet comprising a precursor layer to become a precursor of a porous layer and the aluminum foil was obtained. Thereafter, this laminate sheet was passed between a pair of rolls having flat side faces, so that the aggregate in the precursor layer was pressed against the aluminum foil, whereby an electrode sheet in which a porous layer (having a thickness of 150 μm) was formed on one surface of the collector made of an aluminum foil whereas depressions and projections were formed on the porous layer forming surface of the aluminum foil was produced. The pressure condition of the pressing by the rolls at that time was a linear pressure of 1000 kgf/cm.

Thus obtained electrode sheet was punched out into a size of 20 mm×40 mm, and vacuum drying was carried out at a temperature of 150° to 175° C. for 12 hours or more, so as to eliminate the moisture absorbed by the surface of the porous layer, thereby producing an electrochemical capacitor electrode. Here, a cross section of thus obtained aluminum foil was observed with a scanning electron microscope (SEM), whereby the maximum height from the bottom to top of the depressions and projections formed in the aluminum foil was found to be 5 μm. Two such electrochemical capacitor electrodes were prepared for an anode and a cathode, respectively.

Making of Electrochemical Capacitor

First, an outer edge part of the surface of the collector on the side free of the porous layer in each of thus produced anode and cathode was provided with a lead part (having a width of 2 mm and a length of 10 mm). Subsequently, the anode and cathode were opposed to each other, a separator made of a regenerated cellulose nonwoven fabric (21 mm×41 mm with a thickness of 0.05 mm; product name: TF4050 manufactured by Nippon Kodoshi Corporation) was disposed therebetween, and a laminate (matrix) in which the anode, separator, and cathode were laminated in this order while in a contact state (nonbonding state) was formed.

Next, a sealant material was attached to the seal parts under pressure and heat. Subsequently, the above-mentioned laminate (matrix) was put into a case formed from a flexible composite package film, and the seal parts were heat-sealed to each other. As the flexible composite package film, a laminate in which an innermost layer made of a synthetic resin (layer made of denatured polypropylene) in contact with an electrolyte, a metal layer made of an aluminum foil, and a layer made of polyamide were successively laminated in this order was used. Two such composite package films were overlaid on each other, and their fringes were heat-sealed.

An electrolytic solution (a propylene carbonate solution containing 1.2 mol/L of triethylmethylammonium tetrafluoroborate) was injected into the above-mentioned case, which was then sealed in vacuum, whereby the making of the electrochemical capacitor (electric double layer capacitor) was completed.

Example 2

Making of Porous Layer Forming Coating Liquid

The kneaded product obtained as in Example 1 was stirred for 1 hour with 150 parts by mass of MIBK added thereto, and thus obtained mixture was subjected to final dispersion for a dispersion time of 30 seconds in a media mill disperser, whereby a porous layer forming coating liquid in which the aggregate made of activated carbon, acetylene black, and fluorine rubber had a degree of dispersion of 10 to 30 μm was prepared.

Making of Electrochemical Capacitor Electrode

An electrochemical capacitor electrode was produced as in Example 1 except that the above-mentioned porous layer forming coating liquid was used. A cross section of thus obtained aluminum foil was observed with SEM, whereby the maximum height from the bottom to top of the depressions and projections formed in the aluminum foil was found to be 2 μm. Two such electrochemical capacitor electrodes were prepared for an anode and a cathode, respectively.

Making of Electrochemical Capacitor

An electrochemical capacitor (electric double layer capacitor) was made as in Example 1 except that the above-mentioned anode and cathode were used.

Comparative Example 1

A kneaded product obtained as in Example 1 was stirred for 1 hour with 150 parts by mass of MIBK added thereto, and thus obtained mixture was subjected to final dispersion for a dispersion time of 3 minutes in a media mill disperser, whereby a porous layer forming coating liquid was prepared. Thus obtained porous layer forming coating liquid hardly contained the aggregate, and the degree of dispersion was less than 10 μm.

Making of Electrochemical Capacitor Electrode

An electrochemical capacitor electrode was made as in Example 1 except that the above-mentioned porous layer forming coating liquid was used. In a cross section of the aluminum foil observed with SEM, the aluminum foil was hardly formed with depressions having a size discernible with SEM. Two such electrochemical capacitor electrodes were prepared for an anode and a cathode, respectively.

Making of Electrochemical Capacitor

An electrochemical capacitor (electric double layer capacitor) was made as in Example 1 except that the above-mentioned anode and cathode were used.

Comparative Example 2

Preparing of Porous Layer Forming Coating Liquid

A porous layer forming coating liquid was prepared as in Comparative Example 1 except that the compounding amount of activated carbon was 92 parts by mass, no acetylene black was compounded, and the compounding amount of fluorine rubber was 8 parts by mass. Thus obtained porous layer forming coating liquid hardly contained the aggregate, and the degree of dispersion was less than 10 μm.

Making of Electrochemical Capacitor Electrode

An electrochemical capacitor electrode was made as in Example 1 except that the above-mentioned porous layer forming coating liquid was used. In a cross section of the aluminum foil observed with SEM, the aluminum foil was formed with no projections at all. Two such electrochemical capacitor electrodes were prepared for an anode and a cathode, respectively.

Making of Electrochemical Capacitor

An electrochemical capacitor (electric double layer capacitor) was made as in Example 1 except that the above-mentioned anode and cathode were used.

Measurement of Apparent Density

The apparent density of the porous layer in each of the electrochemical capacitor electrodes made in Examples 1 and 2 and Comparative Examples 1 and 2 was calculated from the mass of the porous layer per 100 cm² and the thickness thereof. Table 1 shows the results.

Characteristic Evaluation Test for Electrochemical Capacitor

In the following manner, the internal resistance of each of the electrochemical capacitors made in Examples 1 and 2 and Comparative Examples 1 and 2 was measured. Namely, the measurement was carried out with SOLARTRON of TOYO Corporation, and the resistance value at 1 kHz was determined as the internal resistance [Ω]. The measurement of the internal resistance was effected at a measurement environment temperature of 25° C. and a relative humidity of 60%. Table 1 shows thus obtained measurement results.

TABLE 1

|  | Apparent density/ g · cm$^{-3}$ | Internal resistance/Ω |
| --- | --- | --- |
| Example 1 | 0.65 | 0.986 |
| Example 2 | 0.64 | 0.985 |
| Comparative Example 1 | 0.66 | 1.162 |
| Comparative Example 2 | 0.62 | 1.700 |

As can be seen from the results shown in Table 1, it was verified that the electrochemical capacitor electrodes made by the method of making an electrochemical capacitor in accordance with the present invention and the electrochemical capacitors using these electrodes (Examples 1 and 2) yield a fully reduced internal resistance and a sufficient electrode characteristic as compared with the electrochemical capacitor electrodes made by the methods of Comparative Examples 1 and 2 and electrochemical capacitors using these electrodes.

What is claimed is:

1. A method of making an electrochemical capacitor electrode comprising a collector having an electronic conductivity and a porous layer having an electronic conductivity, the method comprising:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 μm in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

2. A method of making an electrochemical capacitor electrode according to claim 1, wherein the aggregate is formed by mixing the solid component and the liquid so as to prepare the porous layer forming coating liquid in the coating liquid preparing step.

3. A method of making an electrochemical capacitor electrode according to claim 1, wherein the aggregate or liquid containing the aggregate prepared beforehand is added to the porous layer forming coating liquid in the coating liquid preparing step.

4. A method of making an electrochemical capacitor electrode according to claim 1, wherein the content of the porous particle in the solid component is 88 to 92 mass % based on the total amount of the solid component.

5. A method of making an electrochemical capacitor electrode according to claim 1, wherein the content of the binder in the solid component is 6.5 to 12 mass % based on the total amount of the solid component.

6. A method of making an electrochemical capacitor electrode according to claim 1, wherein the solid component comprises 88 to 92 mass % of the porous particle, 6.5 to 12 mass % of the binder, and 0 to 1.5 mass % of a conductive auxiliary agent having an electronic conductivity based on the total amount of the solid component.

7. A method of making an electrochemical capacitor electrode according to claim 6, wherein the conductive auxiliary agent is carbon black.

8. A method of making an electrochemical capacitor electrode according to claim 1, wherein the binder is fluorine rubber.

9. A method of making an electrochemical capacitor electrode according to claim 1, wherein the collector comprises aluminum.

10. A method of making an electrochemical capacitor electrode according to claim 1, wherein the collector and the porous layer are pressed by roll pressing.

11. A method of making an electrochemical capacitor electrode according to claim 1, wherein, in the pressing step, a cylindrical roller having a side face formed with an irregularity pattern is used so as to press the collector and the porous layer while bringing the side face of the roller into contact with a surface of the porous layer, thereby forming an irregularity pattern on the surface of the porous layer.

12. An electrochemical capacitor electrode comprising a collector having an electronic conductivity and a porous layer having an electronic conductivity, the electrochemical capacitor electrode being made by a method comprising:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 μm in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

13. An electrochemical capacitor comprising:

first and second electrodes opposing each other;

a separator disposed between the first and second electrodes;

an electrolyte; and a case for accommodating the first electrode, second electrode, separator, and electrolyte in a closed state;

wherein at least one of the first and second electrodes is an electrode comprising a collector having an electronic conductivity and a porous layer having an electronic conductivity, the electrochemical capacitor electrode being made by a method comprising:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 $\mu$m in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

14. An electrochemical capacitor according to claim 13, wherein each of the first and second electrodes is an electrode comprising a collector having an electronic conductivity and a porous layer having an electronic conductivity, the electrochemical capacitor electrode being made by a method comprising:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 $\mu$m in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

15. A method of making an electrochemical capacitor comprising first and second electrodes opposing each other, a separator disposed between the first and second electrodes, an electrolyte, and a case for accommodating the first electrode, second electrode, separator, and electrolyte in a closed state, the method comprising:

a first step of making an electrochemical capacitor electrode comprising a collector having an electronic conductivity and a porous layer having an electronic conductivity;

a second step of arranging the separator between the first and second electrodes while using the electrode obtained by the first step as at least one of the first and second electrodes;

a third step of accommodating the first electrode, second electrode, and separator into the case;

a fourth step of injecting the electrolyte into the case; and a fifth step of closing the case;

wherein the first step comprises:

a coating liquid preparing step of preparing a porous layer forming coating liquid containing a solid component including a porous particle having an electronic conductivity and a binder adapted to bind the porous particle, a liquid adapted to dissolve or disperse the binder, and an aggregate made of the solid component, such that the aggregate has a degree of dispersion of 10 to 200 $\mu$m in the coating liquid;

a porous layer forming step of applying the porous layer forming coating liquid onto a surface of the collector and then removing the liquid so as to form the porous layer; and a pressing step of pressing the aggregate against the collector by pressing the collector and the porous layer, so as to form a depression and a projection on the surface of the collector formed with the porous layer.

16. A method of making an electrochemical capacitor according to claim 15, wherein the electrode obtained by the first step is used as each of the first and second electrodes.

* * * * *